US008017227B2

(12) United States Patent
Soroushian et al.

(10) Patent No.: US 8,017,227 B2
(45) Date of Patent: Sep. 13, 2011

(54) ADAPTIVE COMPOSITE MATERIALS

(76) Inventors: Parviz Soroushian, Okemos, MI (US); Anagi Manjula Balachandra, Okemos, MI (US)

( * ) Notice: Subject to any disclaimer, the term of this patent is extended or adjusted under 35 U.S.C. 154(b) by 863 days.

(21) Appl. No.: 12/074,071

(22) Filed: Mar. 3, 2008

(65) Prior Publication Data

US 2009/0218537 A1 Sep. 3, 2009

(51) Int. Cl.
*A01K 1/015* (2006.01)

(52) U.S. Cl. ..................... 428/221; 428/301.1; 428/209; 442/23; 429/516; 429/532; 429/523

(58) Field of Classification Search .................. 428/221, 428/301.1, 209; 442/23; 252/62.2; 429/516, 429/532, 523, 520, 519
See application file for complete search history.

(56) References Cited

U.S. PATENT DOCUMENTS 5,296,318 A * 3/1994 Gozdz et al. .................. 429/316
6,030,421 A * 2/2000 Gauthier et al. ............. 29/623.1
6,783,709 B2 8/2004 Harreld et al.
6,858,659 B2 2/2005 White et al.
7,108,914 B2 9/2006 Skipor et al.
7,157,184 B2 * 1/2007 Wohrle et al. ................. 429/217
7,736,813 B2 * 6/2010 Esmiller et al. ............... 429/345
2007/0122716 A1 * 5/2007 Seo et al. ...................... 429/251
2007/0231673 A1 * 10/2007 Noh ............................... 429/44
2009/0218537 A1 * 9/2009 Soroushian et al. .......... 252/62.2
2010/0096257 A1 * 4/2010 Soroushian et al. ..... 204/196.02

* cited by examiner

*Primary Examiner* — N. Edwards

(57) ABSTRACT

Shaped articles with the inherent capability to evolve in response to at least one of external and internal stimuli are described. These articles comprise at least one solid electrolyte with at least one dissolved salt, and at least one interface which involves a solid electrolytes and a conductive solid. Electric potential gradients, generated within the solid electrolyte by at least one of external and internal stimuli, guide and drive the self-healing and adaptation phenomena. The electric potential gradient is generated by at least one of the following effects: (i) direct application of an electric potential across the solid electrolyte; (ii) introduction of interfaces of different electrode potentials between the solid electrolyte and conductive solids; (iii) introduction of an interface between the solid electrolyte and a conductive solid embodying atoms of lower ionization energy than at least one of the atoms forming the ions of the dissolved salt in solid electrolyte; (iv) application of external load and environmental effects which, either directly or when interacting with defects developed in the article during manufacturing and use, generate stress and temperature gradients which, in turn, produce or magnify the potential gradients between the interfaces with solid electrolyte. The mechanisms through which the electric potential gradient generated by different stimuli bring about changes in article performance involve migration of ions and their electrodeposition within the solid electrolyte and at interfaces.

6 Claims, 39 Drawing Sheets

Metal Mesh and Polymer Nanocomposite Sheet Prior to Test

Polymer Nanocomposite Sheet After the Test

As-Prepared PVDF-HFP/ZnO/Cu 15 min. 1 hr. 24 hr. 1 week

Prior to Sustained Loading

After Sustained Loading

Unheated Heated

Prior to Test

Unheated Heated

After 5 Minutes of Loading

Unheated Heated

After 15 Minutes of Loading

Metal Mesh and Polymer Nanocomposite Sheet Prior to Test

Polymer Nanocomposite Sheet After the Test

ADAPTIVE COMPOSITE MATERIALS

This invention was made with U.S. government support under Contracts W911W6-04-C-0024 and W911W6-05-C-0010 by U.S. Army. The U.S. government has certain rights in the invention.

DESCRIPTION

1. Field of the Invention

This invention relates generally to active materials stimulated by electric potential gradients generated by at least one of stress gradient, temperature gradient, electrode potential gradient, ionization potential gradient and electric field. The active material is a composite incorporating a solid electrolyte, where introduction of at least one of stress, temperature, electrode potential, ionization energy and electric potential gradients guide and drive transport and deposition of substance within the system to render self-healing, self-adaptation and/or sensory effects, and to facilitate repair and remodeling of the system.

2. Background of the Invention

Solid electrolytes are capable of dissolving salts and producing ions that are associated with their molecules and uniformly distributed within their volume. These ions are highly mobile, and provide solid electrolytes with electric (ionic) conductivity.

The invention relies on the electrochemical potential gradient generated in solid electrolytes by stimuli such as a mechanical stress gradient to apply forces on the mobile ions. Under the effect of said stimuli, the mobile ions are transported and electrodeposited within the solid electrolyte and at their interfaces to render self-healing, self-adaptation and sensory effects in response to physical stimuli, or to facilitate repair and remodeling of the solid electrolyte.

Electrochemical potential gradients can be generated within solid electrolytes by mechanical stress gradients, temperature gradients, ionization energy gradients, and/or electric potential gradients. The physical stimuli driving and guiding ionic transport within solid electrolytes are thus mechanical stress, temperature, interfaces introducing ionization potential gradient, and/or electric potential.

In one aspect, the invention is directed to making material systems with inherent capability for ionic transport and deposition within their volume in order to compensate for damaging effects and/or to adapt to altered service environments which generate stress and/or temperature gradients within the system.

In another aspect, the invention provides material systems which can be repaired and/or remodeled through application of external electric field to guide and drive ionic transport and deposition within their volume with the objective of enhancing the system performance.

In another aspect, the invention is directed to making material systems which are stimulated by ionization energy difference to transportions toward and deposit them at interfaces for local enhancement of system behavior through improved interfacial bonding and local strengthening.

In another aspect, the invention provides material systems which respond to physical stimuli such as stress, temperature, ionization energy difference and electric potential by generating electric fields or color changes associated with electrolytic transport and deposition of substance, which can be used to detect and quantify the physical stimuli.

Past efforts toward development of self-healing materials rely on chemical reactions prompted upon damage to accomplish self healing. In U.S. Pat. No. 6,858,659 and U.S. Pat. No. 7,108,914 damaging effects break capsules embedded within the material, exposing the polymerizable liquid contained within the capsules to a catalyst incorporated into the material formulation. Subsequent polymerization of the broken capsule content provides the self-healing effect. In U.S. Pat. No. 6,783,709 copolymeric materials with intermediate-strength crosslinks are used, where healing is accomplished by reforming of the crosslinks after disruptive effects. The present invention accomplishes self-healing via electrochemical phenomena, in lieu of the chemical reactions used in the past.

SUMMARY OF THE INVENTION

The present invention incorporates functional qualities for self-healing, self-adaptation, sensing, and facilitation of repair and remodeling into materials and structures. Electrolytic transport and electrodeposition phenomena are primarily responsible for rendering the functional features to materials and structures. These phenomena occur within a solid electrolyte embodying conductive interfaces, and can be driven and guided by a host of stimuli, including mechanical stress gradient, temperature gradient, electrode potential gradient, ionization potential gradient, electric potential gradient, and combinations thereof. These stimuli may be generated spontaneously due to the changes in service environment or material system, thus rendering self-healing, self-adaptation and sensory effects. They may also be introduced intentionally for repair and remodeling purposes.

The self-healing, self-adaptation and sensory features of the present invention provide materials and structures with enhanced levels of safety and versatility, and can be used to design lighter structural and protective systems. The present invention can also facilitate repair and remodeling of structures, which can be used toward enhancement of the life-cycle economy of structural and protective systems.

DETAILED DESCRIPTION OF THE INVENTION

Figure 1:
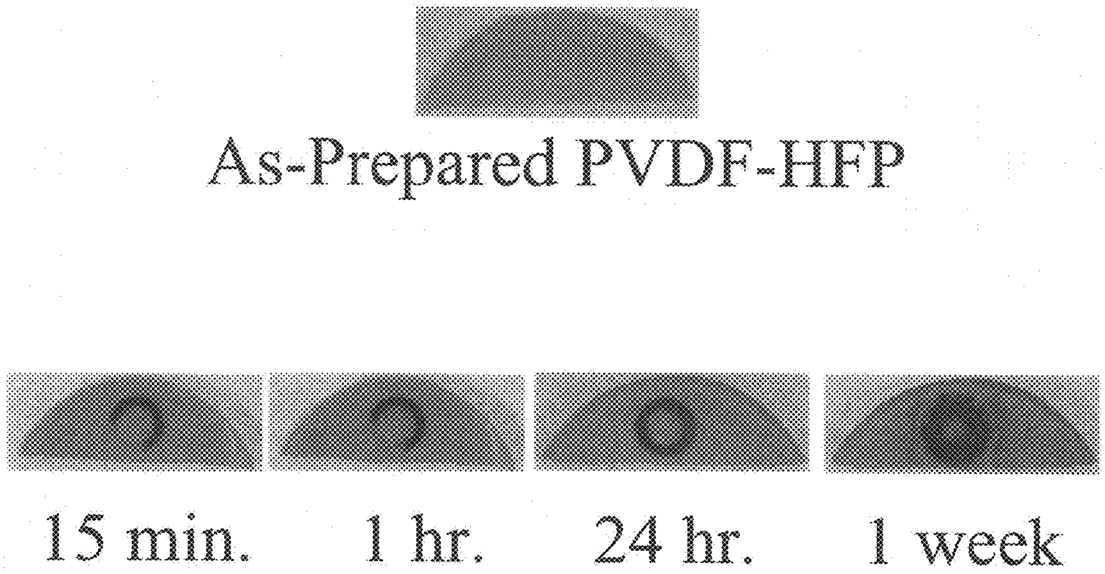
FIG. 1 shows a sample of PVDF-HFP solid polymer electrolyte in as-prepared condition and after different time periods of local compressive stress application via an aluminum tube.

The energy of a system can be changed (from E to E+dE) in various ways: by changing its entropy S, its volume V, its amount of substance n, its electric charge Q, its mass m, etc., as expressed by Gibb's fundamental equation:[1]

$$dE=TdS-pdV+\mu dn+\phi dQ+\psi dm+\ldots$$

where, T is temperature, p is pressure, μ is chemical potential, ϕ is electric potential, and ψ is gravitational potential.

Each of the terms on the right-hand side of the equation is the product of the differential of an extensive quantity and the energy-conjugated intensive quantity. The intensive quantity determines the magnitude of an energy change related to a change of the corresponding extensive quantity. For example, if we add the entropy dS to a system, the energy increase is large if the temperature is high, and it is small, if the temperature is low.

The chemical potential μ can be explained based on the tendency of every substance to change through: (i) reaction with other substances; (ii) transformation into another state of aggregation; and (iii) migration to another place. Examples of this would be rusting of iron, evaporation of water, weathering of wood or rocks, and spoiling of foodstuffs or medicines even in an airtight pack. The perishing of chemicals in sealed bottles shows that the cause or driving force for these ubiquitous phenomena is not an interaction between different substances, but it is an intrinsic property of each substance itself. This tendency can be described by a single physical quantity, the chemical potential. The value of the chemical potential always refers to a specific substance. For a given substance, it also depends on temperature, pressure and, if it is a solute, its concentration and the kind of solvent. Moreover, it depends on the phase or state of aggregation of the substance.[1]

A chemical reaction, a phase change, or a migration take place voluntarily, because the tendency for a change is more pronounced in the initial state than in the final state, i.e., because the chemical potential in the initial state A is greater than in the final state B:

$\mu_A > \mu_B$: transformation of substance A into substance B, or transport from place A to place B $\mu_A = \mu_B$: no transformation, no transport, chemical equilibrium $\mu_A < \mu_B$: transformation of substance B into substance A, or transport from place B to place A.

A and B must not necessarily be pure substances. Each of them can be any combination of substances: a mixture, an alloy, a solution, or even a set of substances in various distinct environments.

A difference of chemical potentials is not sufficient for a reaction to proceed. Many substances are stable even though, according to the chemical potentials, they should decompose. Many mixtures of substances do not react although it seems they would if only the values of the chemical potentials mattered. Thus, many of the substances around us, such as wood, metals and plastic materials, should react with the oxygen in air. The reason why these reactions do not take place is the reaction resistance. The situation is similar to the condition where two bodies carry electric charge and have different electric potentials. In spite of the potential difference, it may be that no electric current would flow. The reason is that the resistance of the connection between the bodies is too high. There are several other analogies of this kind: a body (with a mass) does not move from a high to low gravitational potential because the table on which it is lying represents too high a resistance for the movement of the body. The air in a car tire does not leak out, i.e., it does not follow the pressure difference, since the wall of the tire represents a high resistance for the flow. Entropy only reluctantly follows a temperature gradient if the thermal resistance is high. Just as we control a flow of electric charge by making the electric resistance high or low by means of a switch, a chemical reaction can be switched on or off by acting upon the chemical resistance.[1] Several methods can be employed to reduce the reaction resistance. If we consider a reaction with more than one reactant, the first thing to do would be to bring the reactants in contact by pulverizing and mixing them. If this does not help, the next measure would be to increase the temperature. The reaction resistance decreases strongly with the increasing temperature. In this case, attention has to be paid to the fact that chemical potentials are also temperature dependent, although generally much less so than the reaction resistance. A more elegant method to speed up a reaction is to use a catalyst: a further substance is added, whose amount does not change as the reaction proceeds. By adding the catalyst, the reaction is switched on. Removing the catalyst switches the reaction off. This is directly comparable to an electric current which is switched on or off by means of an electric switch.

Chemical potentials depend upon pressure (and temperature). For practical purposes it is often sufficient to use a linear approximation of the function relating chemical potential to pressure. This means that we can describe the dependency by a single coefficient (β):[1]

$$\mu(p)=\mu(p_0)+\beta(p-p_0)$$

where, $\mu(p)$ and $\mu(p_0)$ are chemical potentials of a particular species at pressures p and $p_0$, respectively. This relationship implies that chemical potential varies monotonically with increasing pressure (the chemical potential usually increases when pressure grows, which implies that the pressure coefficient, β, of chemical potential is positive). It is often possible to consider a pressure difference as the driving force of a flow of a liquid or a gas. In the same way, a concentration gradient or difference is considered as the driving force for the diffusion of a dissolved substance. In general, the correct 'force' is not a respective difference of the pressure or concentration, but a difference of the chemical potential. Temperature, like pressure, causes changes in chemical potential. Hence, chemical potential gradient can be generated by temperature gradient within the system.

As noted above, chemical potential constitutes the driving force which can act upon an amount of substance n. A gradient of chemical potential can cause a flow of n, a substance current. It should be noted that n is only one of several extensive quantities which are carried by a substance (or by the particles that constitute the substance). Other such quantities are the mass m, electric charge Q, entropy S, and angular momentum L. Whenever one of these quantities—let us call it X—is coupled to the amount of the substance n, then the flow of the substance must not necessarily be driven by a gradient of the chemical potential. It can also be driven by the conjugated intensive quantity of the extensive quantity X. The stronger the coupling, the more efficient is the 'entrainment' or 'drag'. Actually, some of the above-mentioned extensive quantities are rigidly coupled to n, for instance mass and electric charge. As a result, a current $J_n$ of the amount of substance n is necessarily associated with a mass current $J_m$:

$$J_m=M_m \cdot J_n$$

where, $M_m$ is the molar mass. If the substance carries electric charge, then $J_n$ is associated with a well-defined electric current $J_Q$:

$$J_Q=z \cdot F \cdot J_n$$

where, F is the Faraday constant, and z is a small integer that indicates how many elementary charges are associated with one charge carrier. Sometimes, the coupling between n and the entropy S can be considered just as rigid. In this case, we can write $$J_S=s \cdot J_n$$

where, s is the molar entropy.

Whenever one of the couplings introduced above exists, the effective gradient for a substance flow is not simply that of the chemical potential. The substance flow can also be driven via coupling to the mass, electric charge, or entropy, by a gradient of the gravitational potential, electric potential or temperature, respectively. Note that we can have a zero net driving force although non-zero gradients of both the chemical potential and the gravitational (or electric, temperature) potential may exist. An example is when an electric potential is acting along with the chemical potential. Now the pertinent combined potential (η) is the electro-chemical potential:

$$\eta=\mu+z \cdot F \cdot \phi.$$

The condition of zero current is met when the combined potential η is uniform. A vanishing net driving force is possible even when we have both an electric and a chemical potential gradient. Consider as an example two electric conductors in contact with one another, e.g., copper and silver. The chemical potential of the charge carriers is different in each of the two materials. When the two materials are brought in contact, charge carriers displace until an electric potential difference has built up which compensates for the chemical potential difference. In the resulting non-current state, the electrochemical potential has the same value in both materials, whereas both the electric and the chemical potentials display a gradient in the vicinity of the interface (the space-charge layer). The difference of the electric potentials is usually called the contact-potential difference. The electro-chemical potential (multiplied by the elementary charge) is called Fermi energy. The state of constant electro-chemical potential is called electro-chemical equilibrium.

Since stress can bring about changes in chemical potential, stress gradient can act as the driving force for diffusion flux of matter as far as the force on matter resulting from the stress-induced chemical potential gradient can overcome the pertinent resistance against mass transport. The process can be modeled by the chemical transport of ions from one interface to another, guided and driven by the difference in stress condition at the two interfaces. Transport of matter that is charge neutral requires transport of cations and anions in ratios that are consistent with the stoichiometry of the compounds; this process is generally called chemical diffusion. [2] The diffusion flux equations are written in terms of the chemical potential gradient. The steady state problem is solved by enforcing two boundary conditions on the chemical potential: one at the interface which is the source, and the other at the interface which serves as the sink of matter. The boundary condition is expressed as the excess chemical potential induced by a normal stress, $\sigma_n$, in the following way:

$$\mu_\alpha=\mu_\alpha^0-\sigma_n\cdot\Omega_\alpha$$

where $\Omega_\alpha$ is the volume of the atomic species and $\mu_\alpha^0$ is the reference potential. Note that by convention, $\sigma_n$ is positive when the principal stress is tensile (chemical potential depends only on the force acting perpendicular to the interface). In a multicomponent system, the subscript $\alpha$ refers to each of the diffusing species. In zirconia, for example, $\alpha$ will have two values, one referring to the zirconium ions and the other to the oxygen ions. Normally, only the ion with the slowest diffusion coefficient is considered since it controls the overall kinetics of the transport process.[2]

Internal electrical fields at interfaces, induced by space charge, can influence chemical diffusion to and from interfaces. The diffusion flux equation should thus be written in terms of the electrochemical potential of the ions instead of the chemical potential. This leads to the following new form of the stress-induced diffusion flux equation for defining the boundary conditions at interfaces in ionic materials:

$$j_\alpha=\mu_\alpha^0-\sigma_n\cdot\Omega_\alpha-e\cdot u_\alpha\cdot\phi$$

where, $j_\alpha$ denotes the electrochemical potential of species, specifically at interfaces. The electrochemical potential of a species must be uniform throughout the specimen when the equilibrium state has been reached. In the above equation, e is the magnitude of the charge (expressed in Coulombs) on an electron, $u_\alpha$ is the valency or the charge number on the ion $\alpha$, $\phi$ is the local electrical potential, $\mu_\alpha^0$ is the chemical potential of the species in the standard state, $\sigma_n$ is the normal stress applied to the interface, and $\Omega_\alpha$ is the effective volume of the ion. [2]

In the case of two similar interfaces where only one of them is subjected to normal stress $\sigma_n$, the "steady state" voltage difference between the two interfaces can be found by enforcing equilibrium, that is where the electrochemical potentials of ions just underneath the two interfaces are equal. This condition yields the following expression for steady-state voltage difference $\Delta\phi$ between stressed and unstressed interfaces:

$$\Delta\phi=\phi_1-\phi_2=\Delta\mu_\alpha/(e\cdot u_\alpha)=\sigma_n\Omega_\alpha/(e\cdot u_\alpha)$$

where, $\phi_1$ and $\phi_2$ are the electrical potentials at the stressed and the unstressed interfaces.

The above calculations of the stress-induced changes in chemical potential and thus electric potential were derived for stresses applied normal to the interface. Stresses applied upon the conductive material parallel to the interface can also generate changes in potential. These stresses, and their associated strains, cause an increase in interface area, which changes the total double-layer potential in the vicinity of the interface (and also the total interfacial energy); there are also minor changes in chemical potential under stress which are similar to those discussed above for stresses normal to the interface. Hence, various stress systems which may be normal to or parallel with the interface can induce changes in chemical potential and thus electrical potential at the interface.

When the two interfaces are dissimilar, they exhibit a chemical potential difference which should be added to the $\Delta\mu_\alpha$ term in above equation.

The velocity v is proportional to the driving force P: (v=M·P).[3] The coefficient of proportionality M is called mobility, which is a function of temperature. In general, however, the velocity-driving force relation is nonlinear. Hence, the mobility can be uniquely defined for a small driving force. This mobility is usually considered to be an intrinsic material property, which does not depend on the type of driving force. When the driving force is chemical potential difference ($\Delta\mu_\alpha$), the surface diffusion flux $J_\alpha$ for species $\alpha$ is based on a standard mobility-driving force model ($J_\alpha=M_\alpha\cdot\Delta\mu_\alpha$).

Solid electrolytes, including those resulting from the complexation of low-lattice-energy salts with high-molecular-mass solvating polymers, incorporate highly mobile ions such as copper, zinc and lithium cations. [4, 5] The ionic conductivity as well as the mechanical performance and thermal stability of solid polymer electrolytes can be enhanced through introduction of nanoparticles which interact with polymer chain configuration, counterions and plasticizers in solid polymer electrolytes. [6, 7]

For a dilute ideal electrolyte, the ionic conductivity $\sigma$ ($S\cdot cm^{-1}$) can be expressed as: [8]

$$\sigma=F^2\cdot\Sigma_i(u_i^2\cdot M_i\cdot c_i)$$

where, F is Faraday's constant, $u_i$ is the valence of species i, $M_i$ is the mobility ($cm^2\cdot mol\cdot J^{-1}\cdot s^{-1}$), and $c_i$ ($mol\ cm^{-3}$) the species concentration. At infinite dilution, the diffusion coefficient $D_i$ may be related to the mobility $M_i$ via the Nernst-Einstein equation: [8]

$$D_i=M_i\cdot R\cdot T$$

where, T denotes temperature, and R is a constant (8.134 joule/mole K).

These two equations are valid for dilute, unassociated electrolytes. Nevertheless, they are easy to work with and describe general trends in electrolytes. [8]

Solid electrolytes embody mobile ions which can be transported within the solid in response to electrochemical potential gradients generated by stress, temperature, electric potential, and/or chemical potential gradients. Stress gradients can be generated, for example, by damaging effects such as microcracks in loaded systems. Tensile stresses lower the chemical potential of ionic species, while compressive stresses increase the chemical potential of same species. Under stress gradients, therefore, forces are applied to dissolved ions which, given their mobility in solid electrolytes, drive them from highly compressed areas to regions subjected to tensile (or smaller compressive) stresses, where they electrodeposit and can render self-healing effects. The same phenomena can render self-adaptation effects by altering the distribution of substance within structural systems in response to stress gradients generated under altered service environments. The stress-induced chemical potential gradients also generate electric potential gradients which can be used to detect and quantify stress gradients and thus damaging effects.

Temperature, like stress, alters the chemical potential. Temperature gradient can thus act as stress gradient, causing electrolytic transport and deposition of substance within solid electrolytes to provide self-healing, self-adaptation and sensing capabilities.

Introduction of interfaces with lower ionization energies than those of ions within the solid electrolyte leads to exchange of electrons at the interface and subsequent deposition of ions from the solution, which can enhance interface bonding to the solid electrolyte, and can render local strengthening effects.

Dissimilar interfaces also set up electrochemical potential differences within solid electrolytes, which drive ionic species toward and deposit them at interfaces with reduced potential to render local improvement of mechanical performance and interfacial bonds.

The ionic transport and local deposition within solid electrolytes can be driven and guided through controlled application of external electric field for the purpose of redistributing substance for repair and/or remodeling purposes.

The present invention may be further understood from the tests that were performed as described in the examples below.

INVENTION AND COMPARISON EXAMPLES

Example 1

Introduction

A series of experiments were conducted to evaluate stress-induced electrolytic mass transport and deposition phenomena in solid electrolytes; the effects of introduction of zinc oxide and copper nanoparticles into the solid electrolyte were also investigated.

Materials

PVDF-HFP (poly(vinylidine fluoride-co-hexafluropropylene) pellets with 15% HFP and average molecular weight, $M_w$, of ~400,000, CuTf (copper(II) tifluoromethane sulfonate), EC (ethylene carbonate), PC (propylene carbonate), THF (tetrathydrofuran), ZnO (zinc oxide) nanoparticles with average particle size of ~30 nm, and copper nanoparticles with average particle size of ~80 nm were the materials used in this example. ZnO nanoparticles were subjected to 300° C. heat treatment in air for 10 minutes, and then to 500° C. for one hour; they were allowed to cool to room temperature.

Preparation of Solid Polymer Electrolyte

Three grams (18% by weight) of PVDF-HFP was dissolved in 55 ml of THF at 60° C. while stirring. Subsequently, CuTf (1.8 g), EC (3.5 g), and PC (1.8 g) were added to the mixture (total of 70 wt. %, at CuTf:EC:PC ratio of 1.0:8.0:3.5), and stirred until a uniform solution was obtained. We made sure that each previous component was completely dissolved before adding the next. The final solution was cast into a container, and left overnight for solvent evaporation at room temperature.

Preparation of Solid Polymer Electrolyte Incorporating ZnO Nanopareticles

In order to prepare ZnO/solid electrolyte nanocomposites, 0.0435 g of ZnO nanoparticles (1 mole % of PVDF-HFP) was dispersed in 40 mL of THF and sonicated for 30 minutes; the dispersion was further sonicated using a sonic horn in an ice bath for 4 minutes using a plastic beaker. The dispersion of ZnO nanoparticles was then centrifuged for 30 minutes (in centrifuge tubes); the supernatant was added to the PVDF-HFP mixture (prepared as described above). The sonication and centrifuging steps were repeated in order to ensure uniform dispersion of ZnO nanoparticles. The final solution was sonic-horned for 5 minutes in order to ensure uniform dispersion and distribution of all ingredients; it was then cast into a container (petri dish or Teflon mold), and left overnight (under sonication for the first few hours to prevent sedimentation due to gravity) for solvent to evaporate. A nanocomposite sheet of PVDF-HFP incorporating ZnO nanoparticles was obtained, which exhibited desirable structural integrity.

Preparation of Solid Polymer Electrolyte Incorporating ZnO and Copper Nanopareticles In a procedure similar to that used for preparation of solid polymer electrolyte/ZnO nanocomposite, in addition to ZnO, copper nanoparticles were also dispersed in THF and sonicated for 30 minutes, and then sonic-horned in an ice bath for 4 minutes using a plastic beaker; the resulting copper dispersion was centrifuged for 30 minutes in centrifuge tubes as done with ZnO dispersion. The supernatant was added to the PVDF-HFP-ZnO mixture (previously prepared, as described above), and the sonication/centrifuging procedure was repeated to ensure uniform dispersion of copper nanoparticles. Just before casting, the blend was sonic-homed for 5 minutes, and then cast into a container (petri dish or Teflon mold) and left overnight (first few hours under sonication) for solvent evaporation.

Experimental Evaluation

Aluminum tubes were used to apply local pressure on the solid polymer electrolyte and solid polymer nanocomposite electrolyte sheets prepared as described above. An aluminum tube was placed on each sheet, and a constant weight was placed on the tube to apply a compressive stress of 0.14 MPa on the specimen. The loaded tube was removed momentarily after different time intervals in order to visually observe the local changes in specimen caused by the application of local stress.

Figure 2:
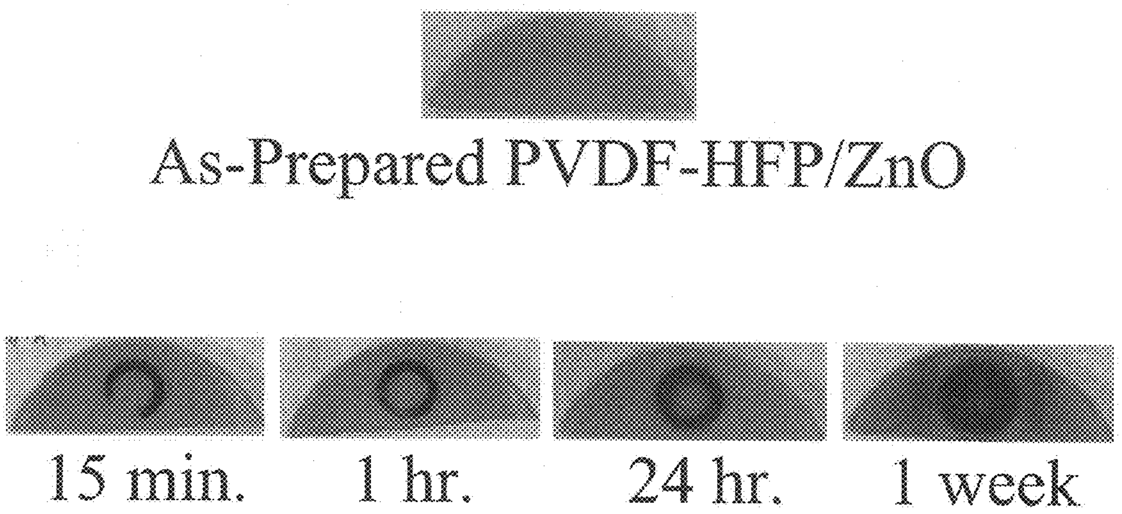
FIG. 2 shows a sample of PVDF-HFP/ZnO solid polymer electrolyte nanocomposite in as-prepared condition and after different time periods of local compressive stress application via an aluminum tube.
Figure 3:
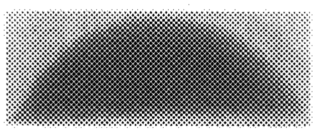
FIG. 3 shows a PVDF-HFP/ZnO/Cu solid polymer electrolyte nanocomposite in as-prepared condition and after different time periods of local compressive stress application via an aluminum tube.
Figure 3:
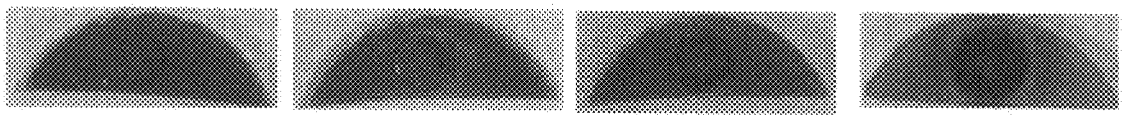
Figure 4:
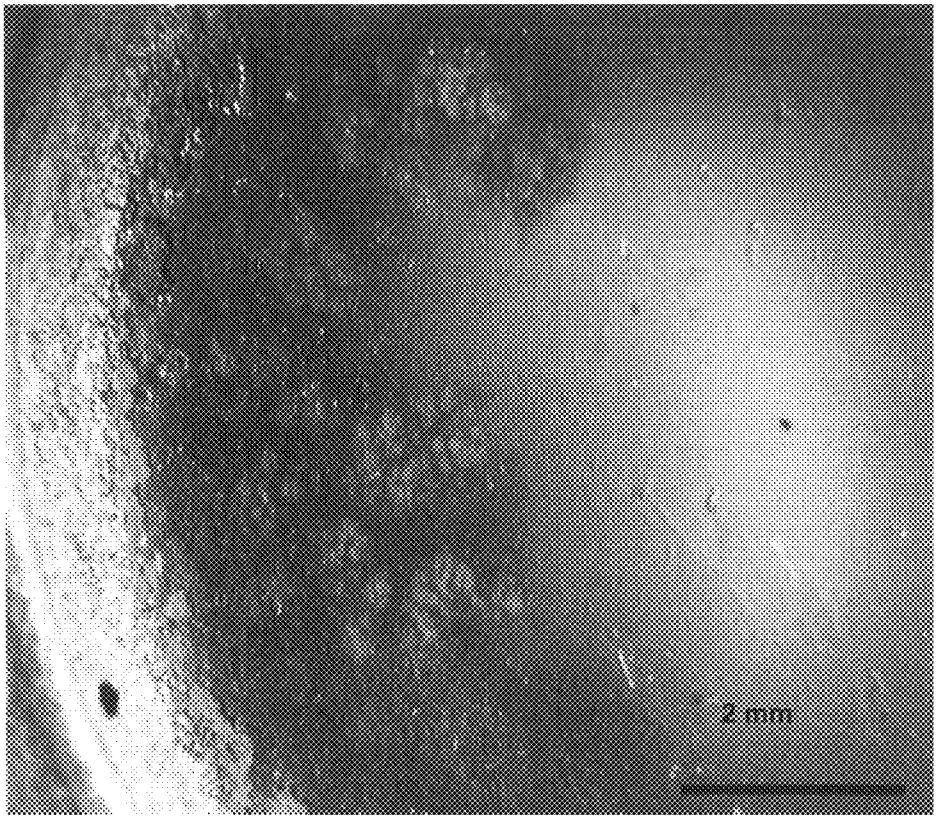
FIG. 4 shown an optic microscope image of PVDF-HFP/ZnO/Cu nanocomposite subjected to local compressive stress via an aluminum tube over a one-week period.
Figure 5:
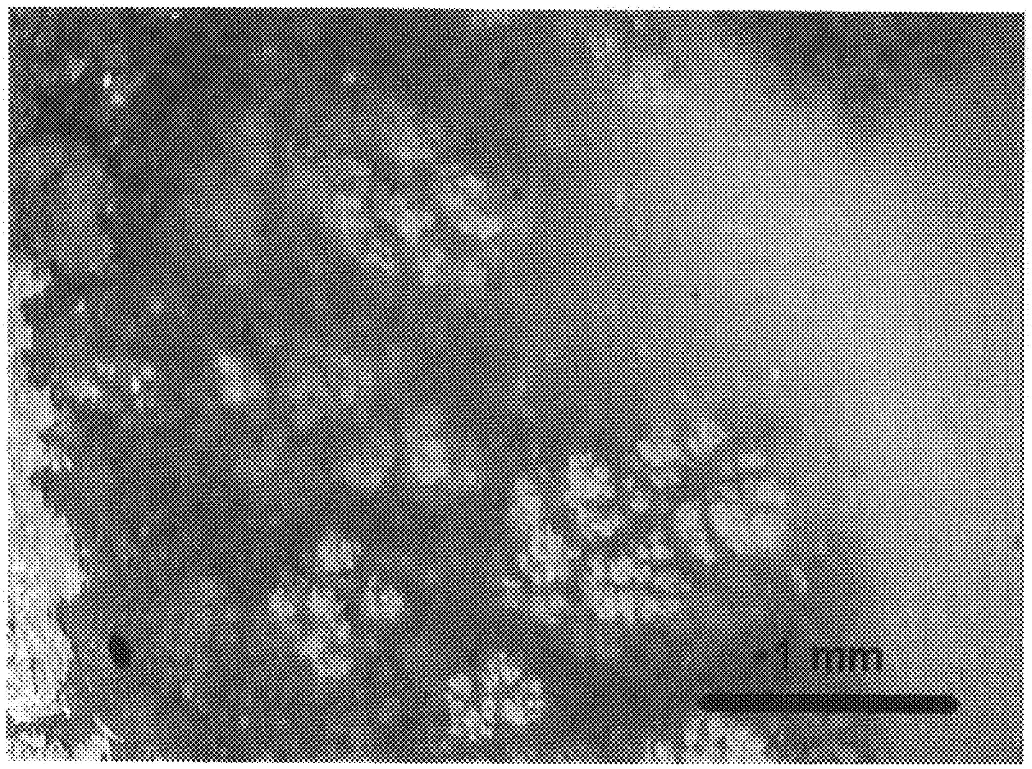
FIG. 5 shows an optic microscope image depicting low-density copper deposition adjacent to the locally stressed area after one week of stress application.

For three specimens (PVDF-HFP solid polymer electrolyte, PVDF-HFP/ZnO nanocomposite solid electrolyte, and PVDF-HFP/ZnO/Cu nanocomposite solid electrolyte, visual evidence of copper deposition was observed within about 5 minutes after initial application of local stress. The visual appearances of specimens after different time periods after local stress application are depicted in FIGS. 1-3. The introduction of ZnO nanoparticles and particularly both the ZnO and copper nanoparticles led to more pronounced copper deposition over time within the locally stressed areas of the solid electrolyte. FIG. 4 shows an optic microscope image of the PVDF-HFP/ZnO/Cu nanocomposite after application of local stress over a period of one week. A dense copper deposit is observed at the surface of the locally stressed area, with copper deposition within the thickness observed adjacent to the stressed area. FIG. 5 is an optic microscope image focusing on the area of within-thickness copper deposition adjacent to the locally stressed area. We attribute the predominantly surface deposition of copper under the locally applied compressive stress (via the aluminum sheet) to the lower ionization energy of aluminum compared with copper, which leads to exchange of electrons between solid aluminum and copper cations, leading to deposition of copper at the interface. Deposition of copper within the volume adjacent to the local area subjected to compressive stress can be attributed to the stress-induced chemical potential gradient between the highly compressed area directly under the load and the adjacent area which experiences smaller stress.

Figure 6:
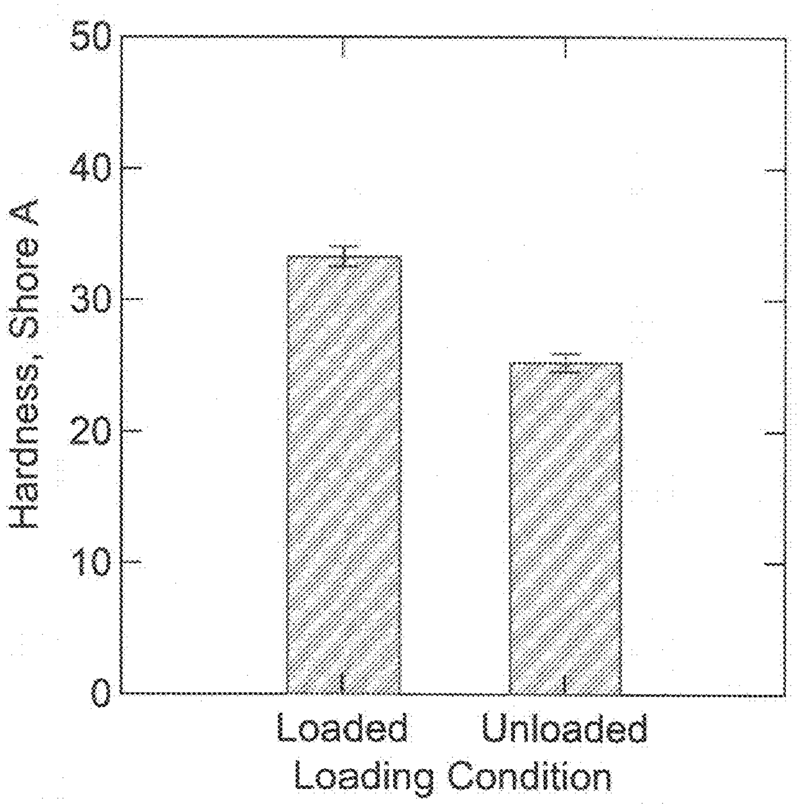
FIG. 6 presents hardness test results (means and standard errors) for PVDF-HFP solid polymer electrolyte in locally stressed (loaded) areas where copper deposition occurred, and in unloaded areas away from stressed areas where copper deposition was not observed.

In the case of the PVDF-HFP specimen subjected to sustained local stress application over one week (FIG. 1), hardness tests were performed in areas subjected to direct stress where surface deposition of copper occurred, and also in areas away from the local area of stress application where copper deposition was not observed. FIG. 6 shows the mean values and standard errors of hardness values (obtained based on 20 replicated tests) for stressed (loaded) and unstressed (unloaded) areas. The mean values of hardness (based on more than 20 replicated tests) in areas without and with copper deposition were 25.3 and 33.3 Shore A, respectively (with corresponding standard deviations of 3.4 and 3.7 shore A, respectively). Statistical analysis (of variance) of results confirmed that the difference in mechanical performance of areas with and without copper deposition was statistically significant (at 99.9% level of confidence). This finding indicates that the deposition phenomena observed in solid electrolytes generate statistically significant gains (32% in this case) in hardness, that is a measure of mechanical performance.

Example 2

The PVDF-HFP/ZnO solid electrolyte polymer nanocomposite was prepared as described above. During casting, a carbon fiber tow was placed inside the mold, and was thus embedded within the solid electrolyte during casting and subsequent solvent evaporation.

Figure 7:
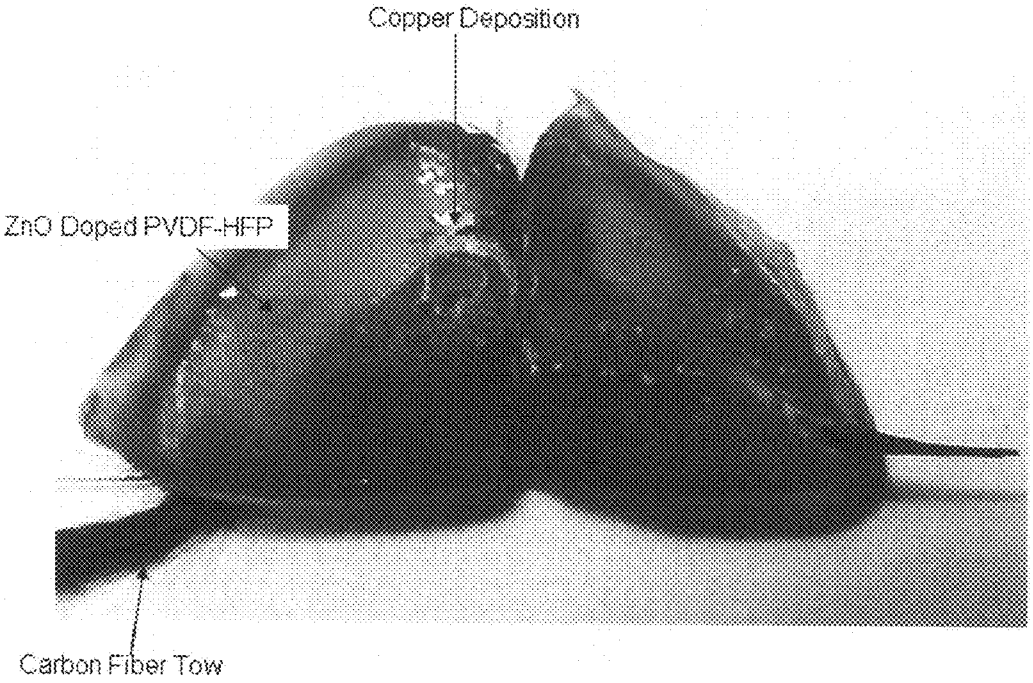
FIG. 7 shows copper deposition under stress in the vicinity of a carbon fiber tow embedded within the active polymer nanocomposite.

The solid electrolyte specimen with embedded carbon (graphite) fiber tow was sandwiched between two non-conducting plastic sheets, and was subjected to a uniform compressive stress of 0.1 MPa. After 72 hours of sustained stress application, as shown in FIG. 7, copper deposition was more pronounced along the fiber tow embedded within the solid electrolyte nanocomposite. The copper deposition observed along the carbon fiber tow could be attributed to the stress gradient (and the resulting chemical potential gradient) generated in the vicinity of carbon fibers due to the higher stiffness of the embedded carbon fibers versus the solid electrolyte matrix. This conclusion is supported by the fact that graphite is highly noble and thus do not generate a chemical potential gradient which favors electrodeposition of copper in the vicinity of carbon fibers.

Example 3

Introduction

A bolted joint is prepared with the solid polymer electrolyte nanocomposite system, and subjected to sustained loads. The sharp stress gradient and the interfaces within the joint area guide and drive deposition phenomena which are shown this example to enhance the mechanical performance of the joint.

Experimental Procedures

The PVDF-HFP/ZnO/Cu solid electrolyte nanocomposite was prepared using the materials and procedures introduced in EXAMPLE 1. Following said procedures, PVDF-HFP was dissolved in THF at 60° C. while stirring. Subsequently, CuTf, EC and PC were added to the mixture, and dissolved until a uniform solution was obtained. Heat-treated ZnO as well as copper nanoparticles were dispersed separately in THF, sonicated, and then repeatedly subjected to a sonic horn in an ice bath and then centrifuged for thorough dispersion of ZnO and copper nanoparticles. The supernatants were added to the PVDF-HFP mixture, and the resulting blend was subjected to repeated sonication and centrifuging to achieve a uniformly dispersed blend. Just before casting, the blend was sonic-horned for a final time.

A carbon fiber fabric was cut into the required size, and was then functionalized in order to enhance the adhesion of carbon fiber fabric to polymer matrix (PVDF-HFP) of the solid electrolyte nanocomposite via different chemical bonds. The functionalization process started with exposure of the carbon fiber fabric to UV/ozone for 30 minutes on each side. UV/ozone was used to break C—C bonds in the hexagonally packed C atoms of carbon fiber, and oxidize the carbon atoms to form carboxylic acid functional groups on their surfaces. To further functionalize the carbon fibers, they were immersed in concentrated HCl solution for 3 days. After three days, the functionalized carbon fabric was rinsed with copious amount of deionized water, and allowed to dry. The exposure to high acidic environment further increased the presence of functional groups on the surface. The fabric was then UV/ozone cleaned for 30 minutes on each side to generate more functional groups on its surface surfaces.

Figure 8:
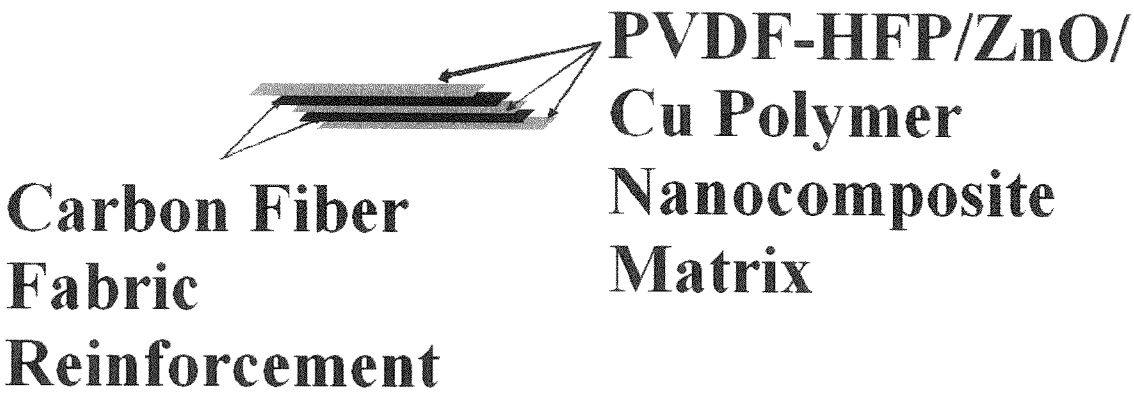
FIG. 8 shows the schematics of the laminated composite of woven carbon fiber fabric and the active polymer nanocomposite matrix.

A laminated composite of PVDF-HFP/ZnO/Cu polymer nanocomposite matrix and carbon fiber fabric reinforcement was prepared by alternately placing the polymer nanocomposite and the coated woven carbon fabric inside a mold (FIG. 8). The carbon fiber fabric volume fraction in the composite was 10%. Solvent evaporation over time, as described in EXAMPLE 1, led to the formation of a solid polymer composite where the polymer nanocomposite matrix was bonded to the functionalized carbon fiber reinforcement.

Figure 9:
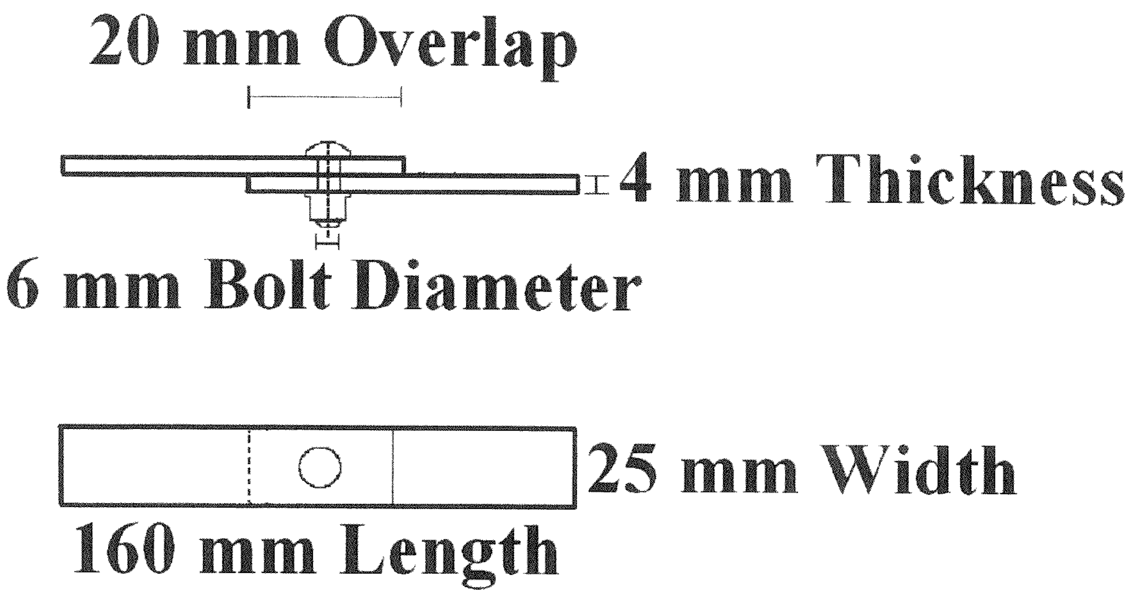
FIG. 9 presents the dimensions of the bolted joint.
Figure 10:
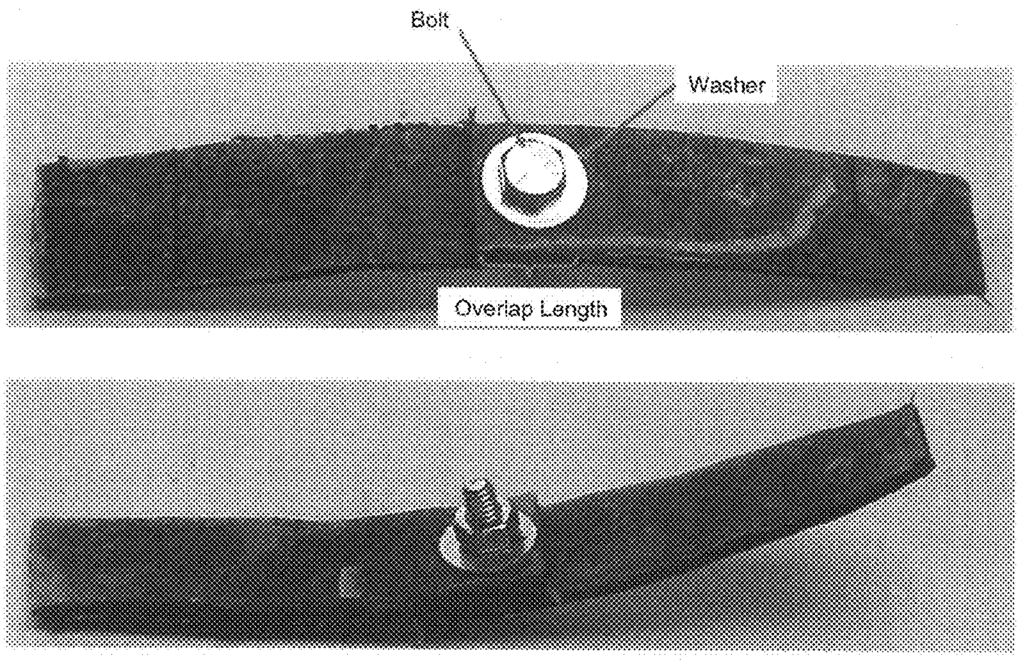
FIG. 10 shows presents pictures of the bolted composite joint.

Two bolted composite joints were prepared using the laminated composite sheets, and steel bolts, nuts and washers. The dimensions of the bolted composite joint are presented in FIG. 9. Pictures of the bolted joint are presented in FIG. 10.

Figure 11:
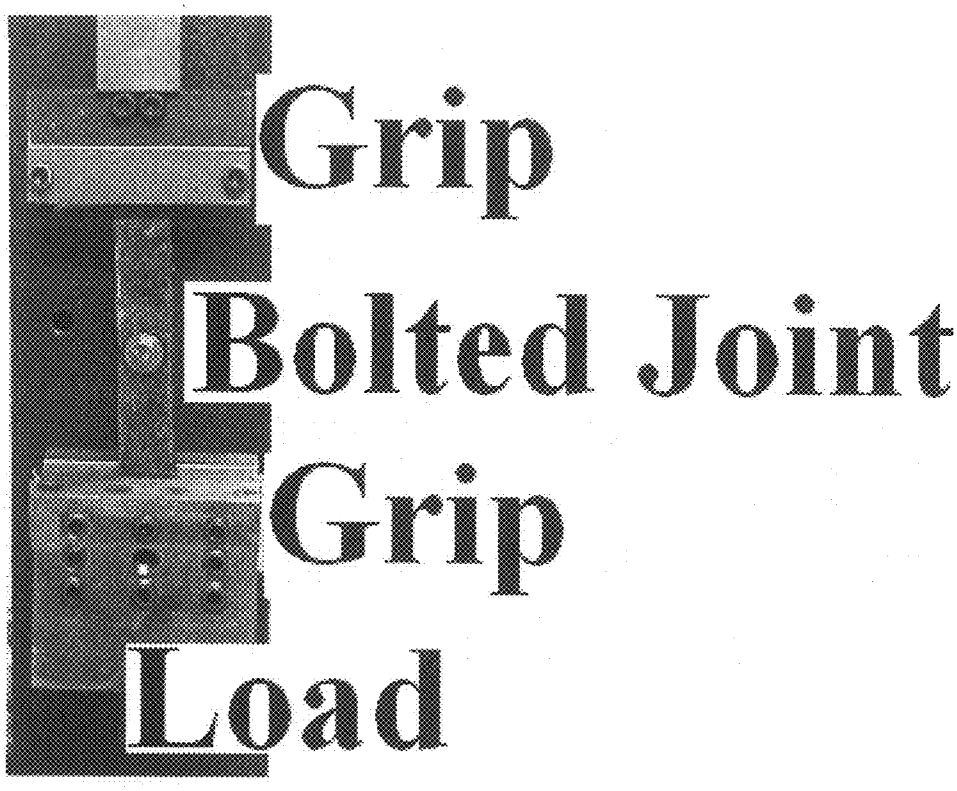
FIG. 11 shows the test set-up used for sustained loading of the bolted composite joint.
Figure 12:
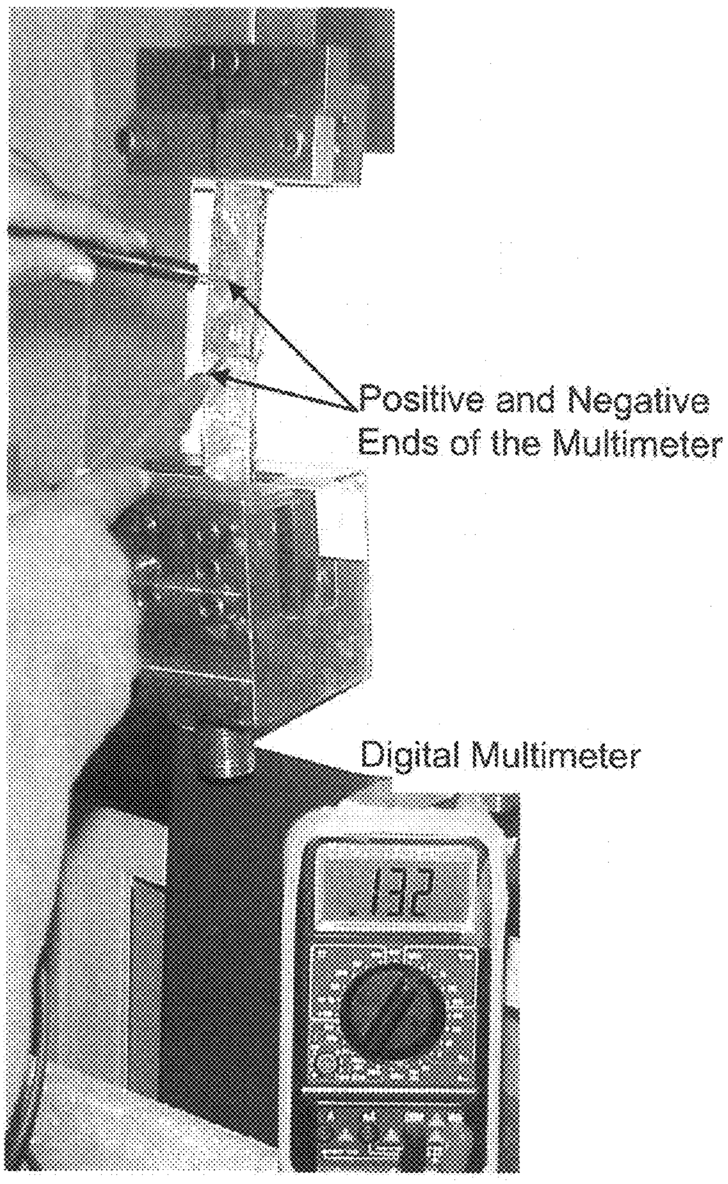
FIG. 12 shows measurement of voltage with a multimeter between different regions of the bolted composite joint subjected to sustained load.

Rubber tabs were glued to the two ends for gripping and application of tensile loads. After testing of one joint specimen under tension to failure, where a peak tensile load of 70 N was recorded, the second specimen was subjected to a sustained tensile load of 35 N (50% of the peak load established in the first test). The experimental setup for application of sustained load to the bolted composite joint is shown in FIG. 11. The electric potential difference and electric current flowing between the critically stressed area near the bolt and the normally stressed area midway between the bolt and the end grip were monitored over time under sustained load. Measurement of voltage with a digital multimeter is shown in FIG. 12. After application of the sustained load over two weeks, the second specimen was tested to failure in tension.

Experimental Results

Figure 13:
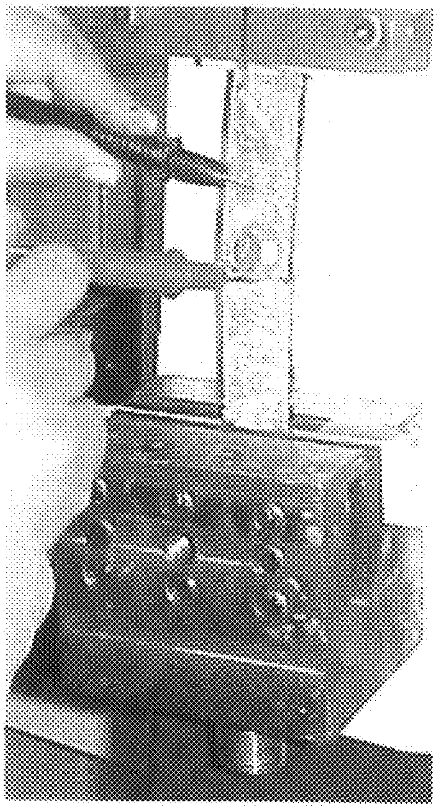
FIG. 13 shows a close view of voltage measurement locations.
Figure 14:
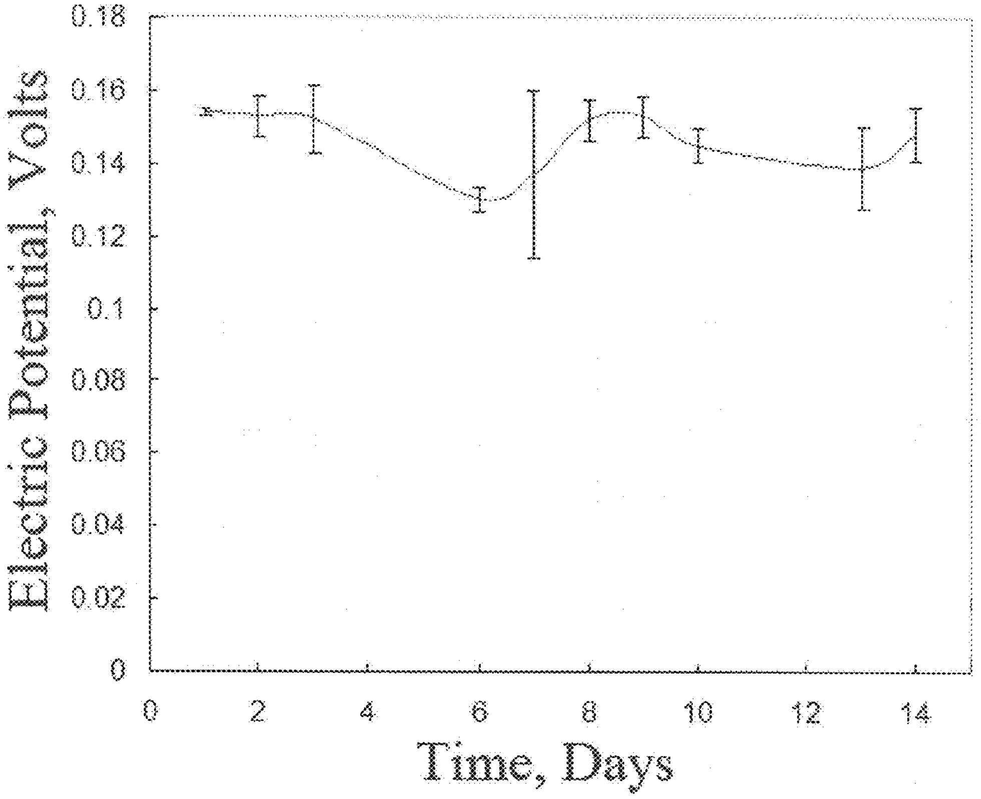
FIG. 14 presents the measured values (daily mean values and ranges) of electric potential difference versus time under sustained loading.

Measurement of voltage between the highly stressed region near the bolt and the normally stressed region midway between the bolt and the end grip (FIG. 13) confirmed that an electric potential gradient develops within the solid polymer nanocomposite electrolyte. The electric potential difference recorded over time under sustained load is presented in FIG. 14. Ten measurements were made daily, and FIG. 14 presents the daily mean values and ranges of the daily measurements. Most measurements occurred in the range from 0.14 V to 0.16 V, and no particular trends in voltage change with time could be detected over the two-week period of measurements. There was no consistent indication of any significant degradation of voltage over the 14-day period of sustained load application. Current was also measured with a precise digital ammeter; the measured values of current were 20.3±10 nA.

Figure 15:
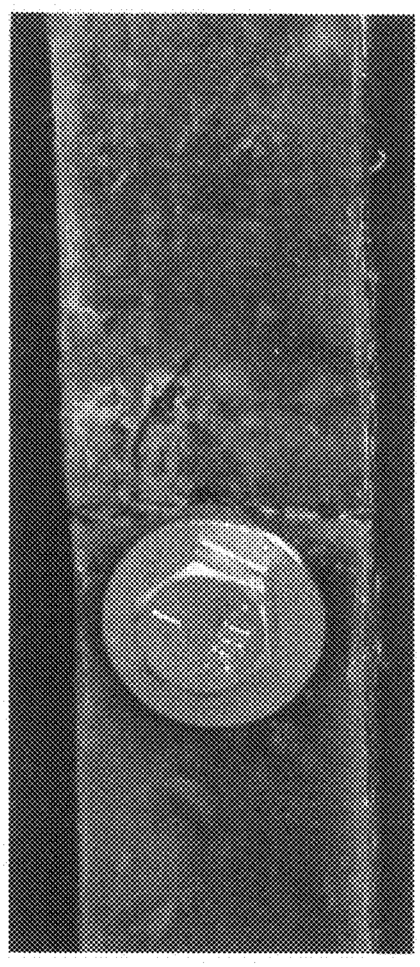
FIG. 15 shows a bolted composite joint prior to application of the sustained load.
Figure 16:
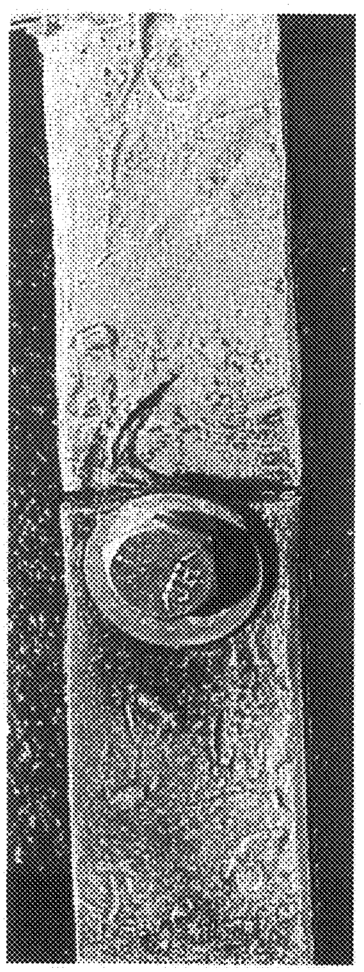
FIG. 16 shows the bolted composite joint after application of the sustained load.

FIGS. 15 and 16 show the bolted composite specimen prior to and after application of sustained load over two weeks, respectively. There are clear indications of copper deposition in the vicinity of the bolt.

Figure 17:
FIG. 17 shows the failed bolted composite joint, tested prior to application of the sustained load.
Figure 18:
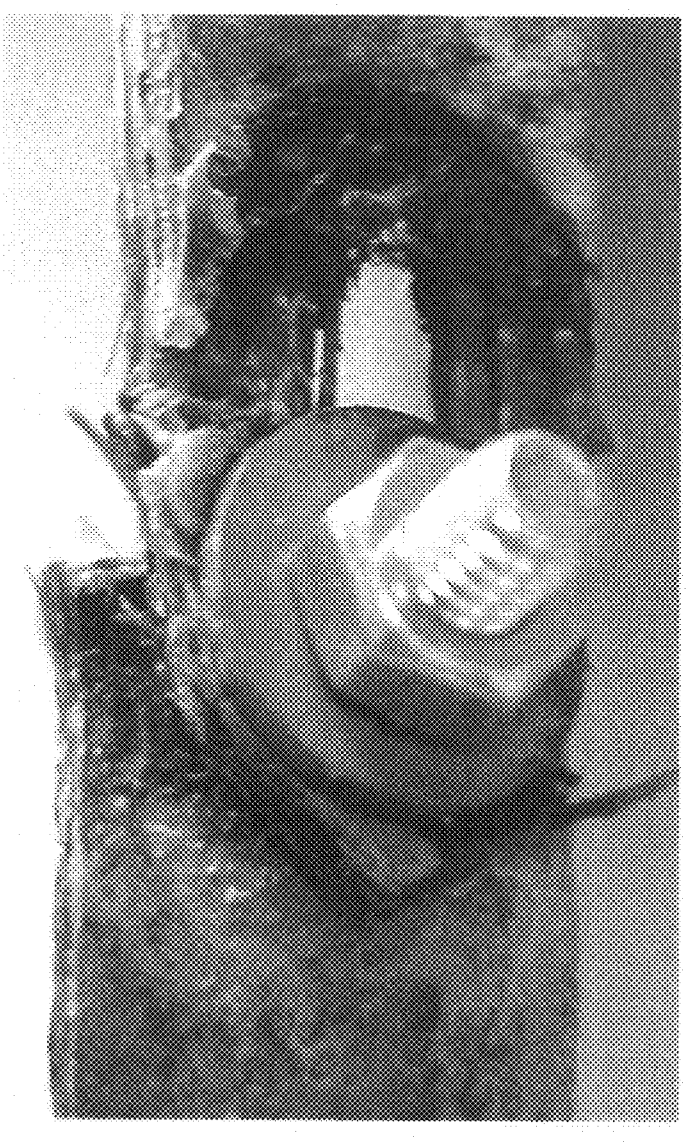
FIG. 18 shows the failed bolted composite joint, tested after application of the sustained load.

The visual appearances of specimens tested to failure in tension prior to and after application of the sustained load are shown in FIGS. 17 and 18, respectively. The specimen which has experienced local copper deposition after application of sustained load experiences a more complex failure mode which covers a greater volume of specimen; this could result from local strengthening of the highly stressed area near the bolt.

Figure 19:
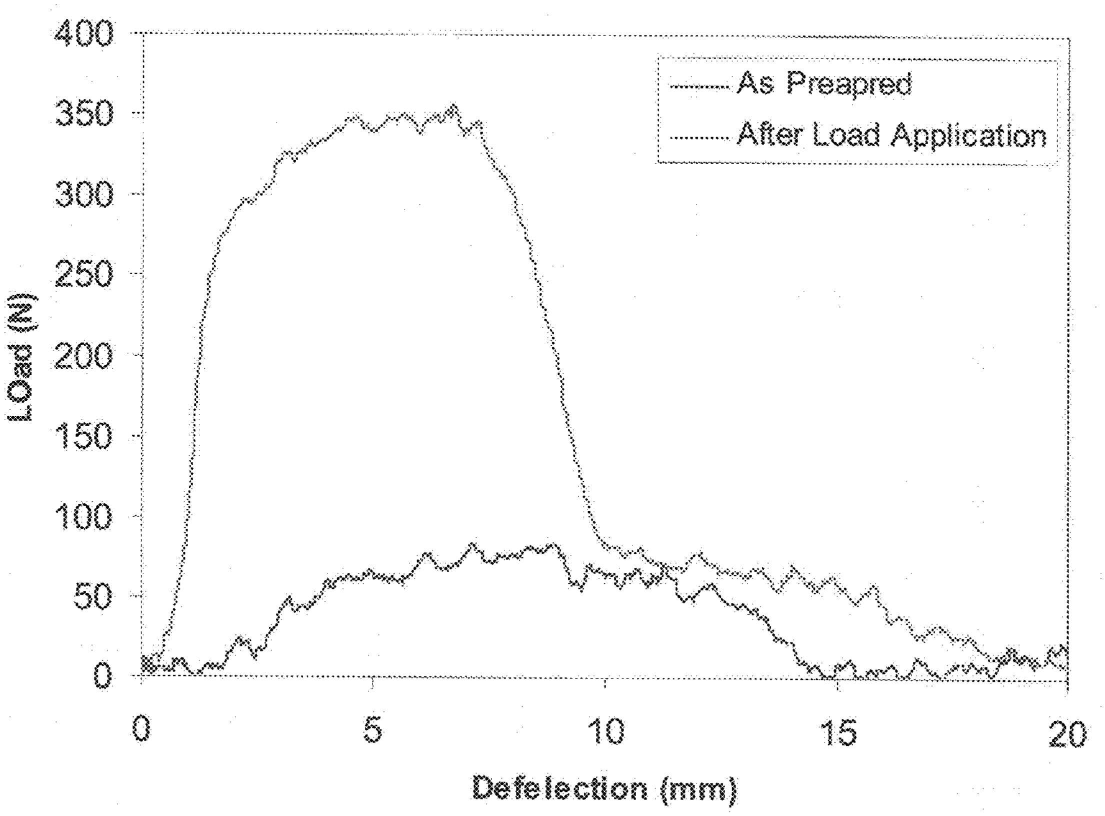
FIG. 19 shows the tensile load-deflection diagrams of bolted composite joints tested prior to and after application of the sustained load.
Figure 20:
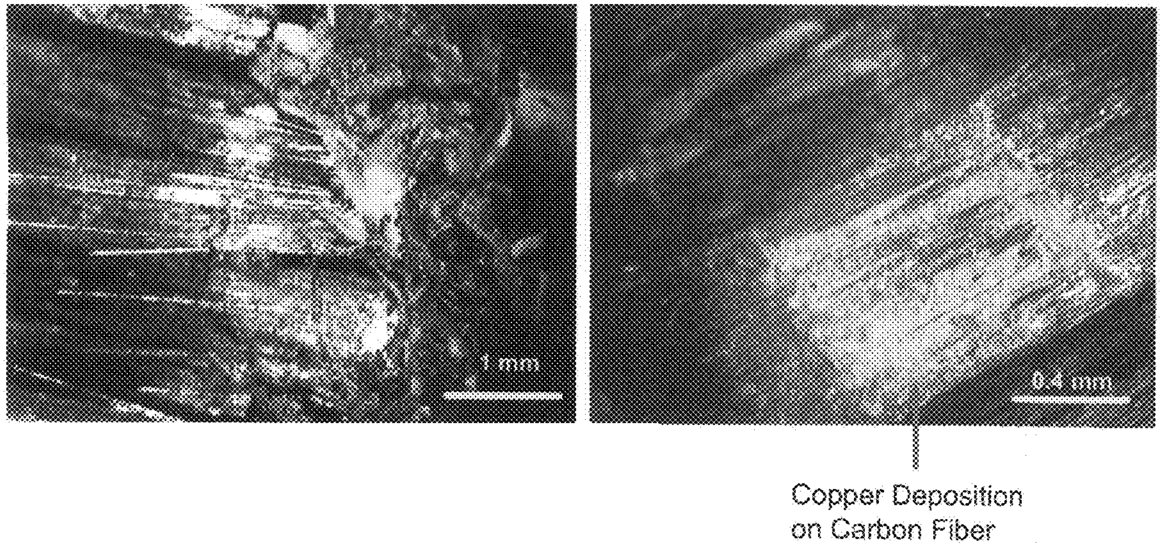
FIG. 20 shows optic microscope images of the failed region of the bolted composite joint tested after application of the sustained load.

The experimental load-deflection curves are shown in FIG. 19 for bolted composite joints tested to failure prior to and after application of sustained load. The joint that has experienced copper deposition under sustained load is observed to provide a tensile load-carrying capacity of 350 N that is greater than the tensile load-carrying capacity of 80 N provided by a similar bolted joint tested without application of the sustained load. Optic microscope images of failed regions of the specimen tested after application of sustained load (FIG. 20) provided further evidence of copper deposition on the carbon fiber reinforcement within the highly stressed region near the bolt.

Copper deposition in the vicinity of the bolt could result from the electric potential gradient Which results partly from stress gradient and partly from the chemical potential gradient between dissimilar interfaces of the steel bolt and the copper nanoparticles with the solid electrolyte.

Example 4

Figure 21:
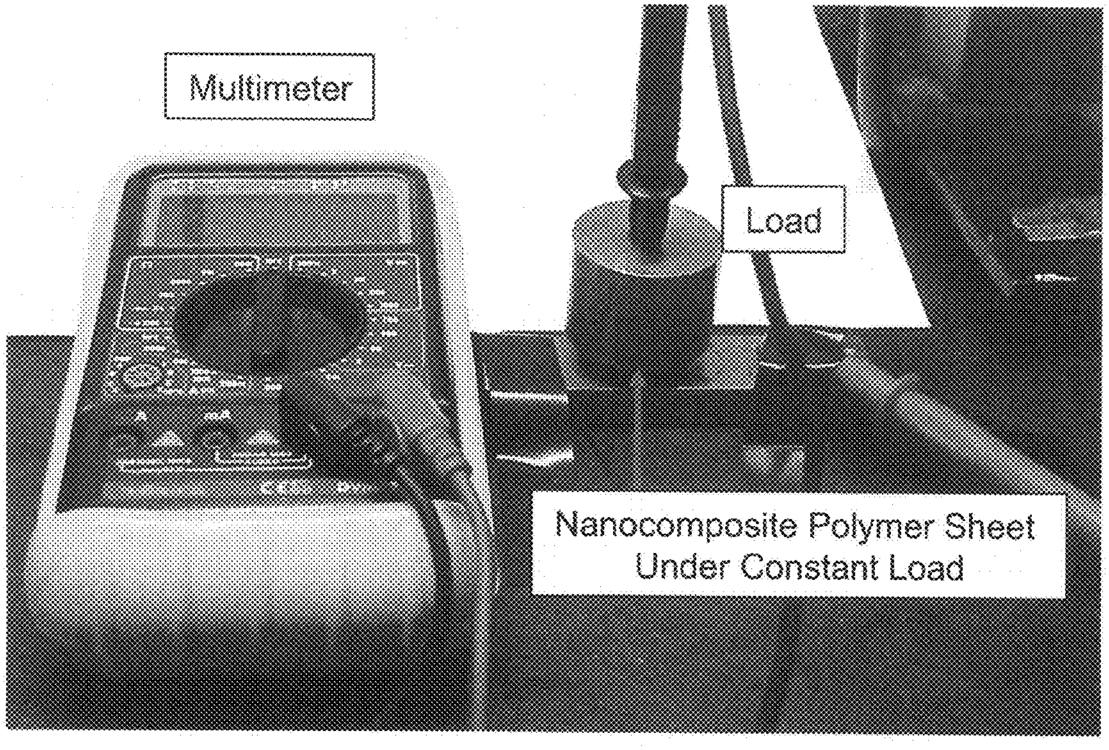
FIG. 21 shows the test set-up used for measurement of the electric potential difference between stressed and unstressed areas of the solid polymer nanocomposite electrolyte.
Figure 22:
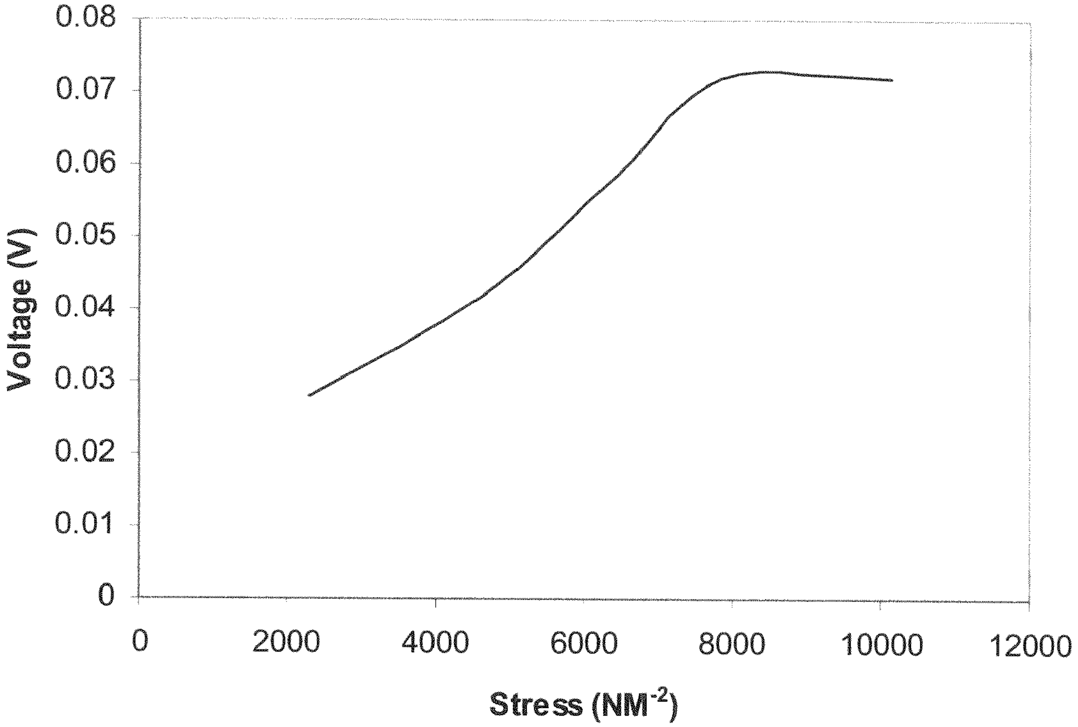
FIG. 22 shows the electric potential difference versus stress difference in the solid polymer nanocomposite electrolyte.

Stress-induced electrochemical potential is one of the key phenomena guiding and driving the ionic transport and deposition of copper within solid electrolyte to render local strengthening effects. In order to produce experimental evidence for generation of electric potential under stress, we subjected a solid polymer nanocomposie electrolyte generated as described under EXAMPLE 1, but with aluminum nanoparticles (in lieu of ZnO and copper nanoparticles) to increasing levels of local compressive stress, and measured the potential difference between stressed and unstressed areas after 5 minutes of stress application. The test setup used in this experiment is shown in FIG. 21. The relationship between applied stress and potential difference (between stressed and unstressed areas of the solid polymer nanocompostie electrolyte) are presented in FIG. 22. An initial linear relationship is observed between the measured values of electric potential difference and stress difference; the potential difference tends to level off at higher values of stress difference.

The theoretical models presented earlier yield the following relationship for the slope of potential difference-stress different relationship ($\Delta\phi/\sigma_n$):

$$\text{Slope} = \frac{\Delta\Phi}{\sigma_n} = \frac{\Omega_\alpha}{eu_\alpha}$$

where, $\Omega_\alpha$ is the effective volume of the ion (copper in this case), e is the magnitude of the charge (expressed in Coulombs) on an electron, and $U_\alpha$ is the valency or the charge number on the ion (copper in this case).

The above equation yields a slope of $3.7\times10^{-6}$ V/Pa, which is smaller than but of the same order of magnitude as the experimentally measured value of $6.3\times10^{-6}$ V/Pa.

Example 5

Carbon nanotube (essentially graphite) exhibits, similar to copper, an electrode potential when exposed to an electrolyte. Carbon nanotube is actually more noble than copper, and is expected to facilitate reduction and deposition of copper cations within the solid polymer electrolyte matrix. As a noble non-metal, carbon nanotubes could add new features to self-healing composites.

In order to investigate the effects of replacement of copper nanoparticles with carbon nanotubes in the solid polymer electrolyte nanocomposite, the procedures of Example 1 were followed to prepare the solid polymer electrolyte nanocomposite, except that copper nanoparticles were replaced with multi-walled carbon nanotubes with 15 nanometer diameter and about 1 micrometer length. The procedures of Example 3 were then followed to prepare two bolted composite joints. One of the two bolted joints was subjected to a sustained load of 49 N at 30% relative humidity and 22° C. temperature, and the second bolted joint was maintained in the same environment without application of the sustained load. The electric potential differences between the highly stressed area near the bolt and the less stressed area midway between the bolt and the end grip were measured over time for the specimen subjected to sustained load. Both loaded and control specimens were tested to failure in tension after two weeks.

Figure 23:
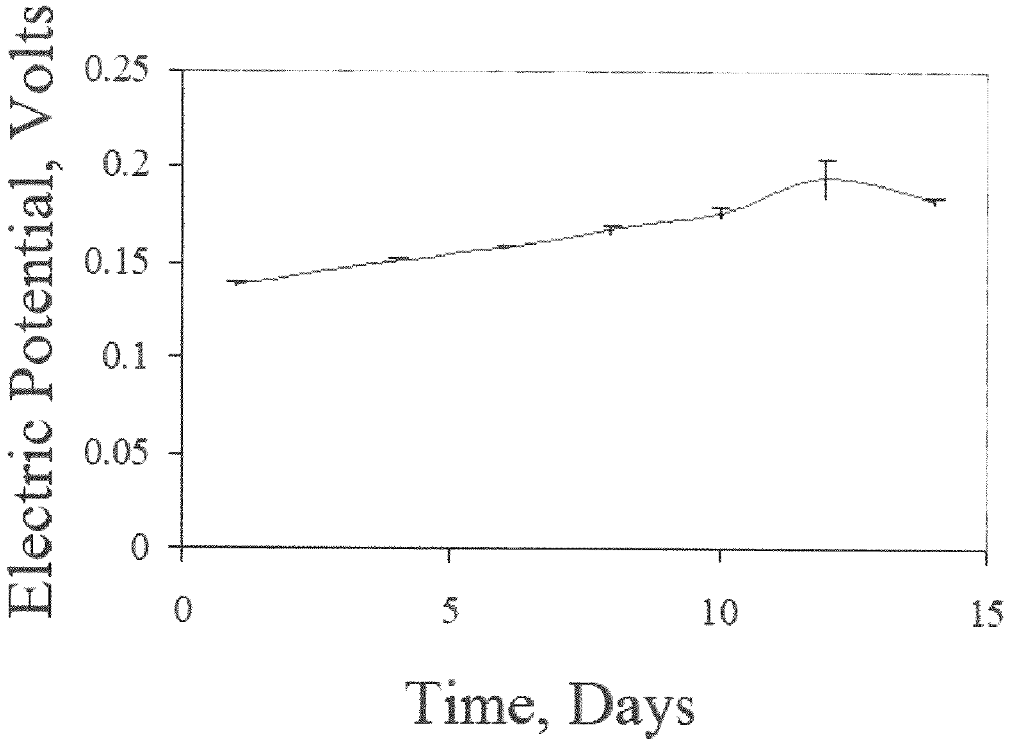
FIG. 23 shows the electric potential difference versus time between the highly stressed area near bolt and the less stressed area midway between the bolt and end grip bolted composite joint made with the solid polymer nanocomposite electrolyte matrix incorporating carbon nanotubes.

The electric potential gradient measurements (means and standard deviations for ten measurements at each time) are presented in FIG. 23. The measured values of potential were of the same order of magnitude as those obtained with copper nanoparticles; with carbon nanotubes, however, the potential continued to increase over the two-week period (while those with copper nanoparticles did not show this trend toward higher values). This observation indicates that carbon nanotubes could provide a more sustainable support for the self-healing process.

Figure 24:
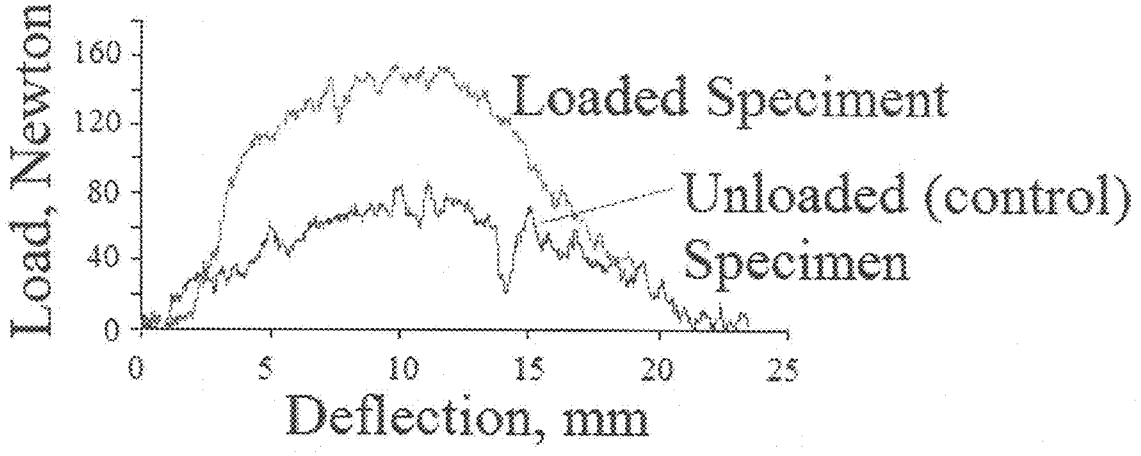
FIG. 24 shows the load-deflection behavior to failure of the loaded and unloaded bolted composite joints made with the solid polymer nanocomposite electrolyte matrix incorporating carbon nanotubes.

The load-deflection curves obtained in tension tests to failure of both the loaded and the unloaded (control) bolted joints are presented in FIG. 24. The loaded composite joint is observed to provide about two times the load-carrying capacity of the control (unloaded) specimen and a comparable level of ductility. The self-healing effect observed with copper nanoparticles generally led to increased strength at the cost of ductility. With carbon nanotubes, however, ductility was not sacrificed to gain strength in the self-healing process. This may have resulted from the altered morphology (e.g., increased aspect ratio) of copper deposits in the presence of carbon nanotubes.

Example 6

The self-healing phenomena are driven by electrical potential gradients within solid polymer electrolyte nanocomposite which are dependent upon stress gradients within the material system. This example covers an experimental program which demonstrate the key role of stress gradient in the self-healing process.

Figure 25:
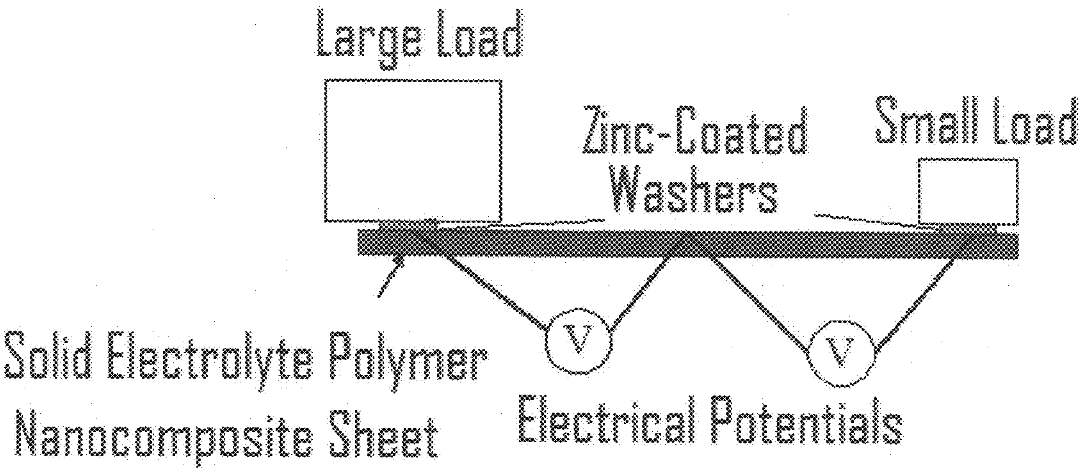
FIG. 25 shows the schematics of the test setup for measurement of the electric potential difference between an unloaded area of the solid polymer nanocomposite electrolyte matrix versus two areas subjected to large and small loads via a zinc-coated washers.
Figure 26:
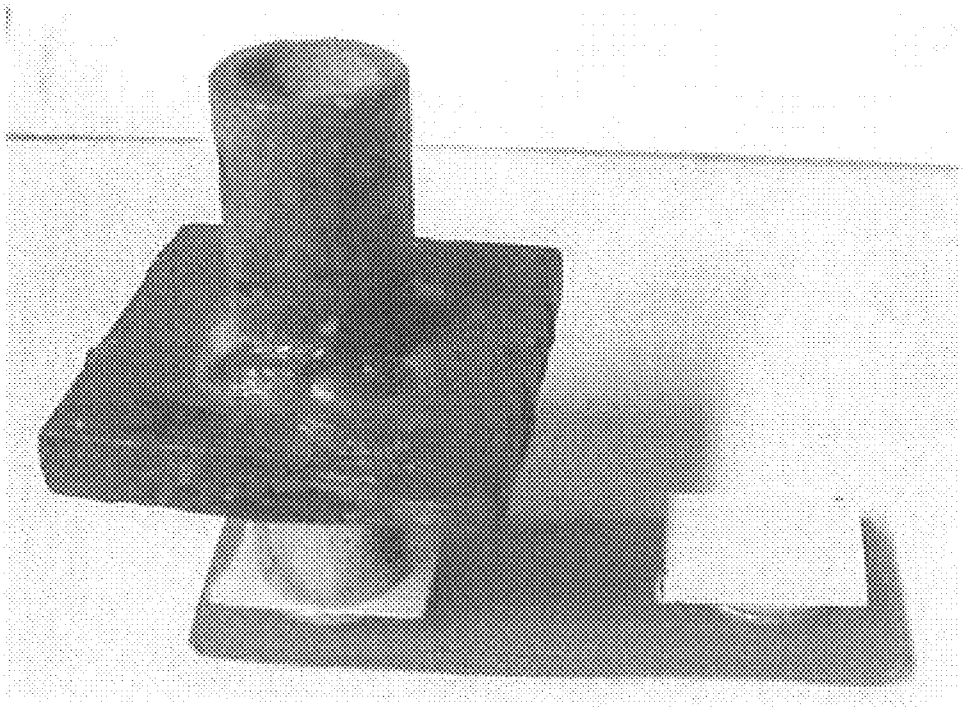
FIG. 26 shows the solid polymer nanocompsotie electrolyte subjected to large and small loads via two zinc-coated washers.

A solid electrolyte polymer nanocomposite sheet was prepared following the procedures of Example 1. Two zinc-coated steel washers were placed on the surface of the polymer sheet with 55 millimeter clear spacing. The zinc-coated washers represent conductive surfaces in contact with the solid electrolyte polymer nanocomposite. A load of 2.8 N was applied on top of one washer, with the other washer subjected to a very small load just to ensured that a more thorough contact is established between the washer and the polymer sheet. A layer of electrically insulating material was placed between the load and the washer. Voltage was measured between the area near each of the washers and center of the polymer sheet. FIGS. 25 and 26 present the schematics and a picture of the test setup.

Figure 27:
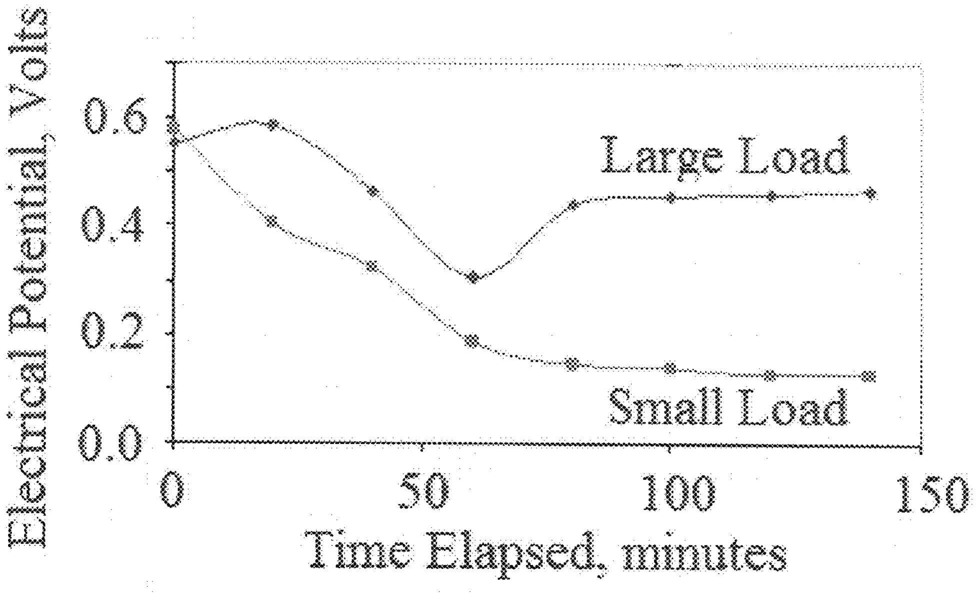
FIG. 27 shows the electric potential difference between unloaded area of solid polymer nanocomposite electrolyte and two areas subjected to large and small loads via zinc-coated washers over initial time period.

The measured values of voltage over time are summarized in FIG. 27 (each point represents the mean value of ten measurements performed at about the same time). During the first hour of measurements, both voltage values dropped continuously over time. Thereafter, the voltage associated with the heavier load increased and reached a plateau level while that associated with the light load continued to drop at a decreasing rate toward a plateau level. The electrical potential associated with the heavier load was consistently larger than that associated with the small load during the period of measurements, which confirms the dependence of electrical potential gradient on stress gradient—a key consideration in the use of potential gradient toward self-healing. The increase in electrical potential (after an initial decrease) under the heavier load suggests that the trend toward copper depletion was probably reversed by transfer of copper cations from areas further away toward the stressed area. This stress-dependent phenomenon would lead to more extensive copper deposition and thus self-healing effects at highly stressed areas.

Figure 28:
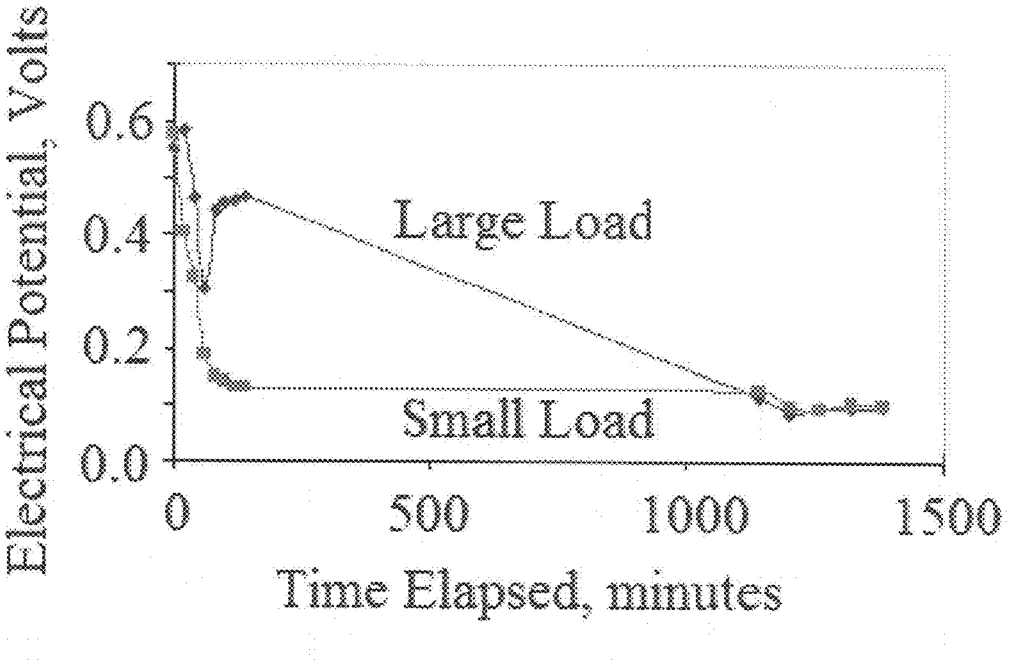
FIG. 28 shows the electric potential difference between unloaded area of solid polymer nanocomposite electrolyte and two areas subjected to large and small loads via zinc-coated washers over longer time period.

The measurements were further continued for 19 hours (FIG. 28). As expected, voltage eventually dropped to a small value for both load levels due to the depletion of copper ion concentration as copper deposition continued.

Figure 29:
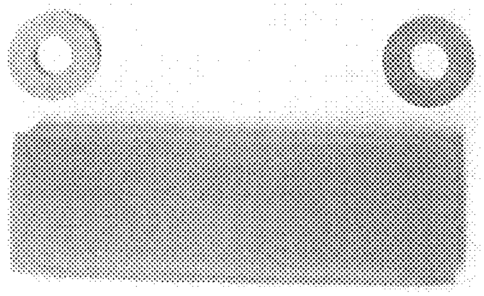
FIG. 29 shows the visual appearances of the solid polymer nanocomposite electrolyte prior to any loading and after application of sustained large and small loads via zinc-coated washers.
Figure 29:
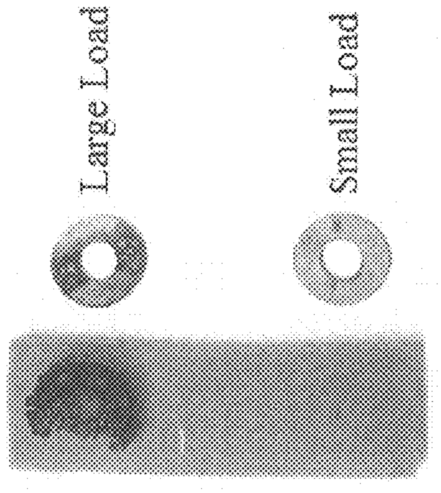

After application of sustained small and large loads through zinc-coated washers, the loads were removed in order to observe the area under washers. The visual observations (FIG. 29) confirmed that a far more extensive copper deposition occurred under the washer subjected to the larger load.

Example 7

Temperature gradient, similar to stress gradient, can induce the electrochemical effects which drive the self-healing process. This example evaluated the potential to enhance the self-healing effects by a combination of temperature and stress gradients.

Figure 30:
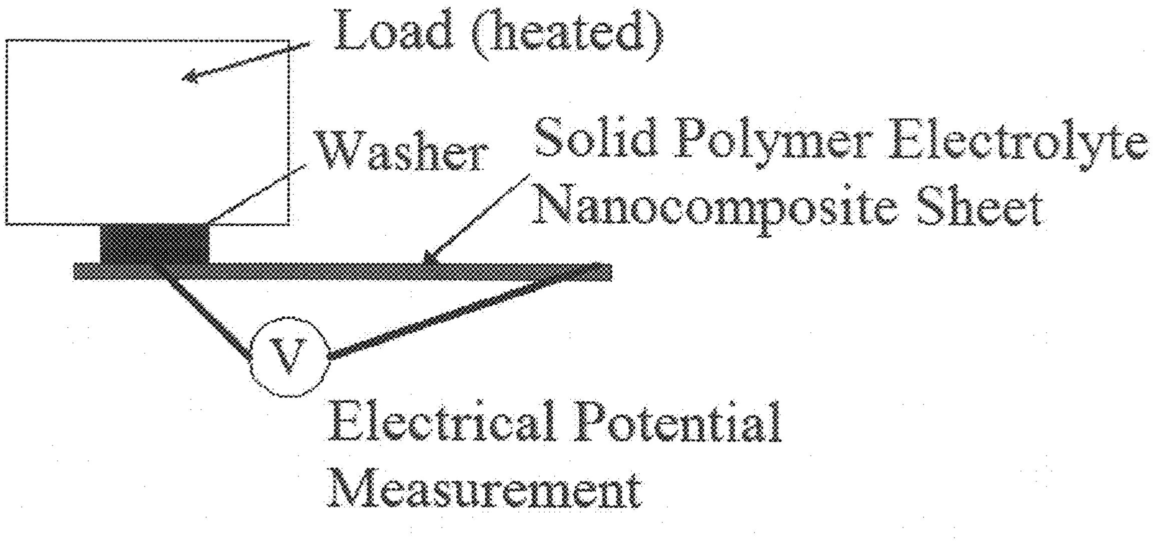
FIG. 30 shows the schematics of the experimental setup for measurement of electric potential difference between an unloaded and unheated area of the solid polymer nanocomposite electrolyte and an area subjected to lading and heating via a zinc-coated washer.

A solid polymer electrolyte nanocomposite sheet was prepared following the procedures described in Example 1 with a thickness of 2.62 mm. Two 25 mm×25 mm square specimens were cut from this sheet. A zinc-coated washer was placed on the surface of each polymer sheet specimen, and a load of 33.5 N was applied to each washer in an environment of 30% relative humidity and 30° C. temperature. One of the washers was heated to 50° C., creating a temperature gradient, in addition to stress gradient, between the area under the washer and the areas away from the washer (FIG. 30). The second washer was not heated; therefore, only stress gradient existed between the area under the washer and the areas away from the washer.

Figure 31:
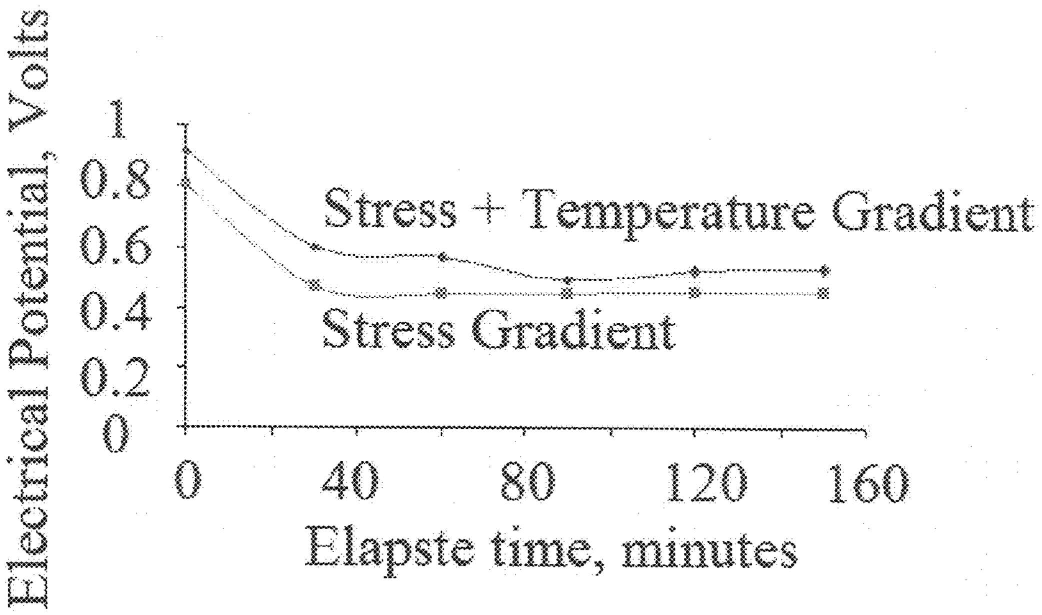
FIG. 31 shows the electric potential difference between an the loaded and unloaded areas of solid polymer nanocomposite electrolyte sheets where in one case the loaded area is also heated while in the other case the loaded area is not heated.

The electric potential measurements are summarized in FIG. 31. The heated specimen subjected to both stress and temperature gradients exhibited a consistently greater electric potential when compared with the unheated specimen subjected to only stress gradient. The relatively large stress gradient may have somewhat overshadowed the effects of the temperature gradient.

Figure 32:
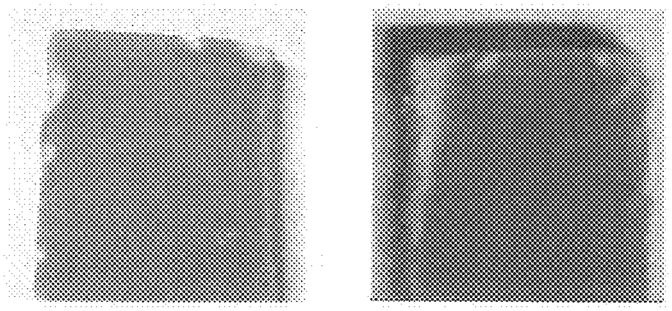
FIG. 32 shows the visual appearances of a solid polymer nanocomposite electrolyte sheet subjected to stress gradient and one subjected to both stress and temperature gradients.
Figure 32:
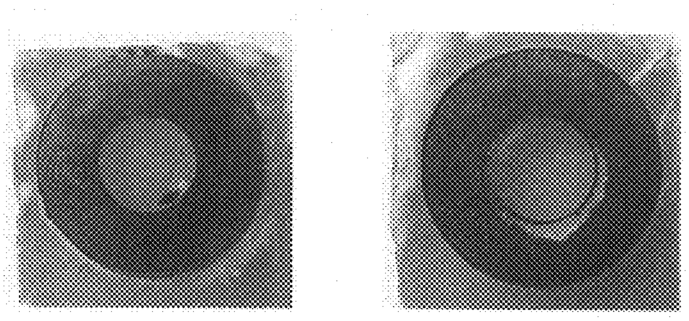
Figure 32:
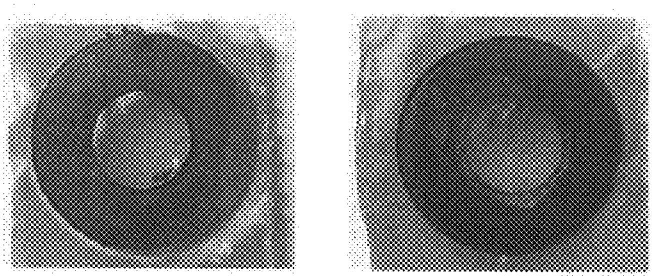

In order to confirm the increased intensity of copper deposition in the presence of temperature gradient, replicated heated and unheated tests were conducted where the extent of copper deposition was visually assessed at 5-minute intervals. The results, presented in FIG. 32, indicate that the presence of both stress and temperature gradients leads to somewhat more copper deposition when compared with the case where only stress gradient is present.

The test results produced in this example indicate that locally elevated temperature, similar to locally elevated stress, can drive the self-healing phenomena and strengthen the location of elevated temperature through metal deposition.

Example 8

Previous examples demonstrated the self-healing effects through visual observations and mechanical (hardness and tension) tests. Elemental analyses via energy dispersive x-ray spectroscopy were performed in this example in order to verify the nature of the deposited matter which renders strengthening effects (speculated to be copper in our specific material design) and to determine any chemical changes associated with the self-healing phenomena.

Figure 33:
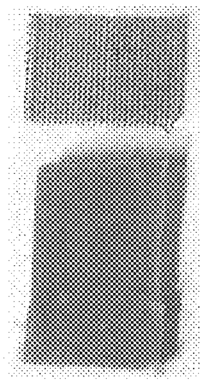
FIG. 33 shows the visual appearance of a solid polymer nanocomposite electrolyte sheet prior to and after contact with zinc-coated metal mesh under pressure.
Figure 33:
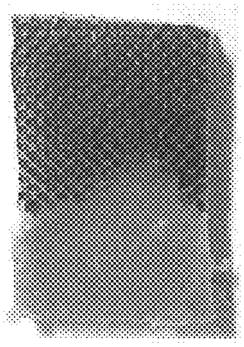

The active polymer nanocomposite sheet was prepared following the procedures of Example 1. The sheet was sandwiched between a zinc-coated steel mesh (mesh size 40×36) on one face and a silicon rubber (polysiloxane, good electrical insulator) on the opposite face. A grip was used to apply pressure upon the mesh supported on the active polymer nanocomposite sheet over a period of 48 hours. FIG. 33 shows the visual appearance of the active polymer nanocomposite sheet prior to and after contact with the zinc-coated steel mesh under pressure. Deposits formed on the active polymer nanocomposite, primarily in areas contacting the metal mesh under pressure.

In order to evaluate elemental changes associated with formation of deposits, the nanocomposite sheet, after contact with zinc-coated steel mesh under sustained pressure, was subjected to energy dispersive x-ray spectroscopy (EDS) in order to obtain information on elemental composition of the sheet within 1 to 2 micrometer depth. In order to perform the EDS analysis, the sample needs to be conductive; hence, a thin coating of carbon was applied on the specimen to ensure its conductivity.

Figure 34:
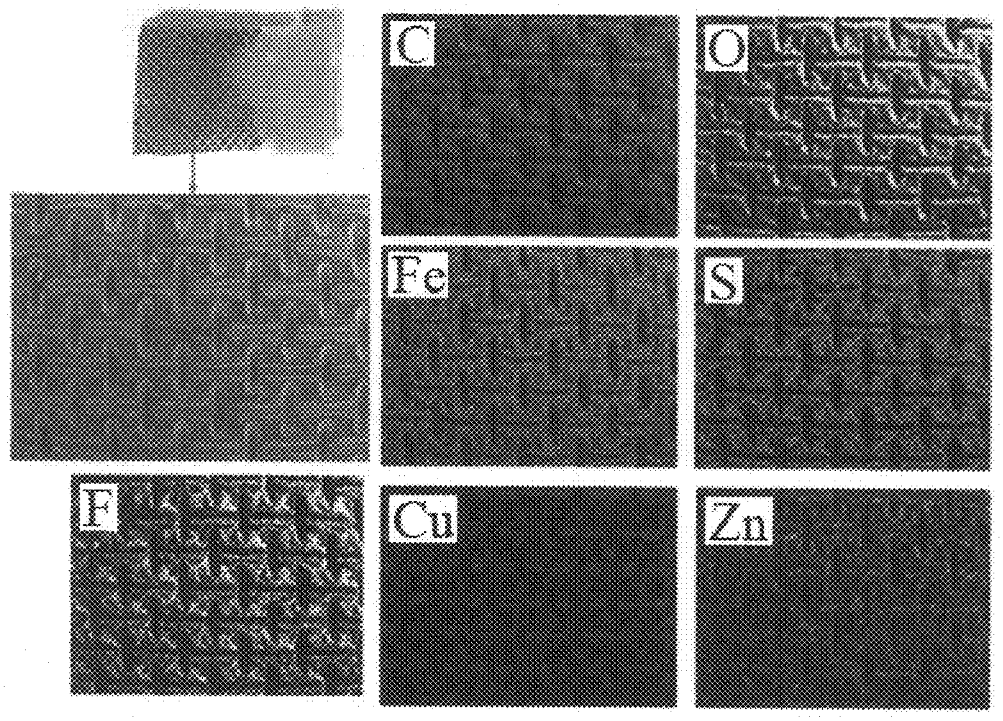
FIG. 34 shows EDS maps of the solid electrolyte polymer nanocomposite surface after contacting the metal mesh under sustained pressure.
Figure 35:
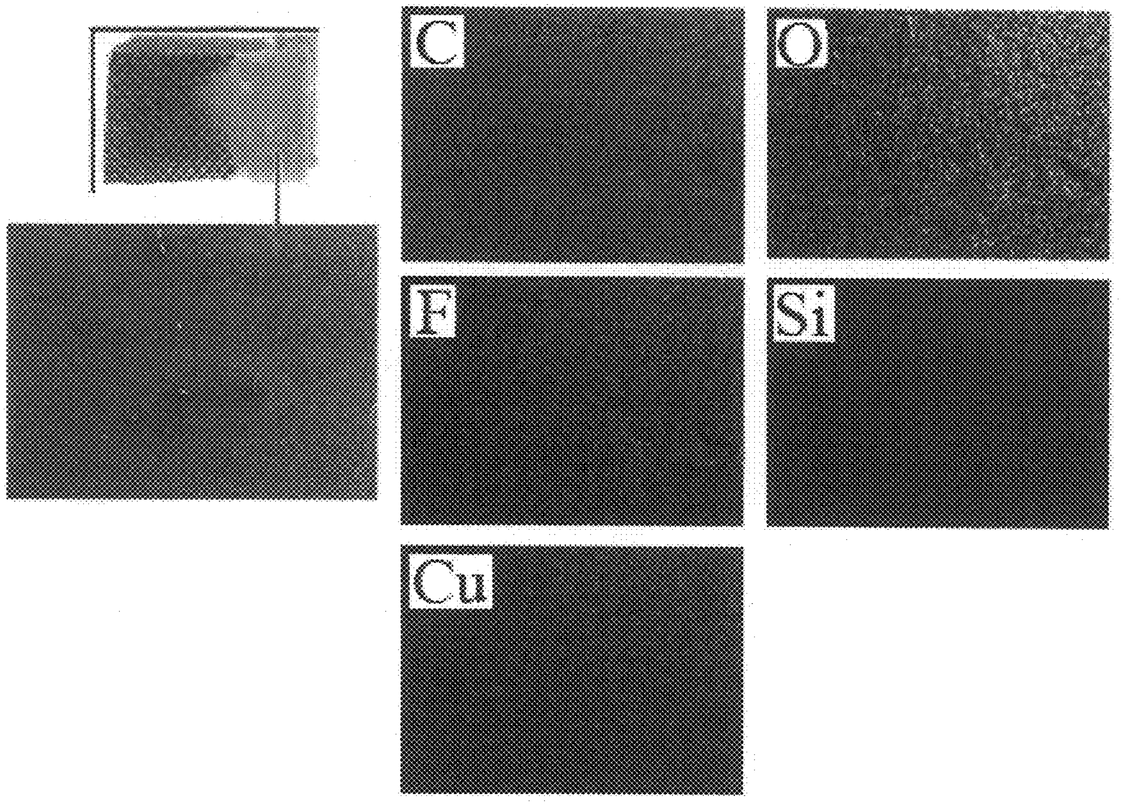
FIG. 35 shows EDS maps of the area of the solid electrolyte polymer nanocomposite which never contacted the metal mesh under sustained pressure.

FIG. 34 shows the EDS maps of the solid polymer nanocomposite electrolyte surface after contact with zinc-coated steel mesh under sustained pressure. Parts of the surface area of polymer nanocomposite which directly contacted the metal mesh under pressure exhibited a strong presence of copper, which confirms that the self-healing effect involves deposition of copper in the vicinity of the conductive surface under pressure. Those parts of the polymer nanocomposite surface area that did not directly contact the mesh had all elements evaluated (C, O, F, Fe, Zn, Cu); the presence of Fe and Zn indicates that dissolution of zinc and iron within the solid polymer electrolyte occurred during the self-healing process. It should be noted that the dissolved CuTf salt and the residual Cu nanoparticles are the source of Cu appearing in unstressed areas of the slid electrolyte polymer nanocomposite sheet (away from the stressed areas in direct contact with the metal mesh). The area of the polymer nanocomposite sheet which never contacted the mesh under sustained pressure exhibited a uniform (not patterned) elemental map (FIG. 35) which reflects the composition of the polymer nanocomposite sheet).

Figure 36:
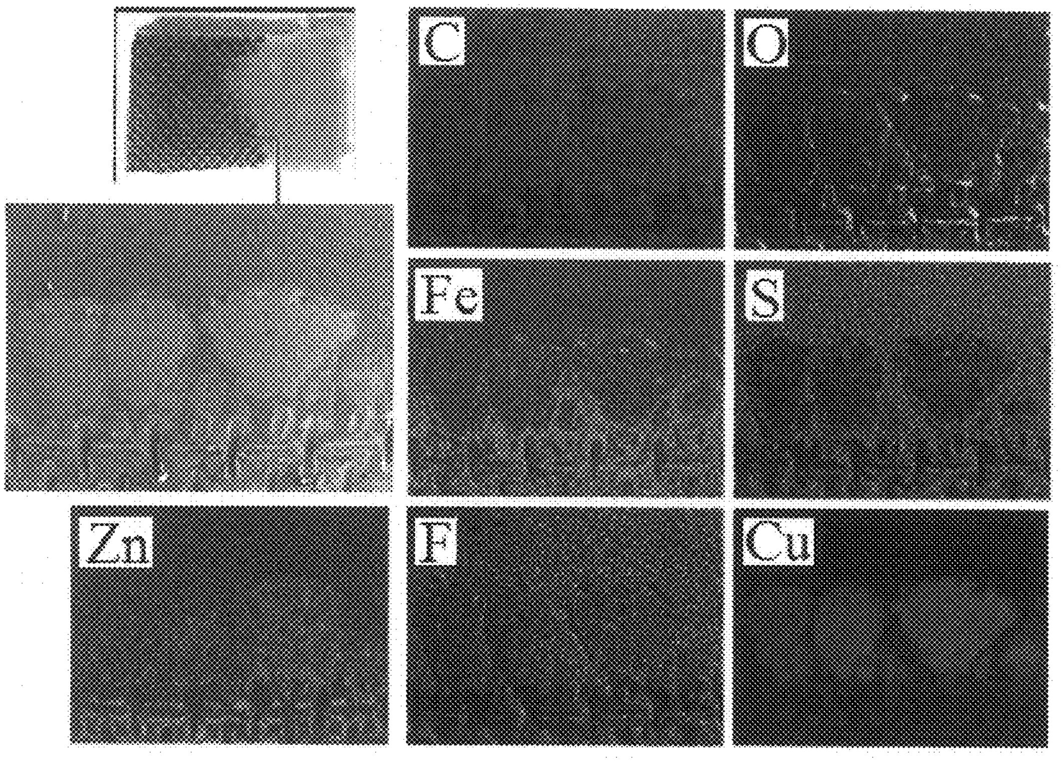
FIG. 36 shows EDS maps of the solid electrolyte polymer nanocomposite sheet at the edge of the contacting metal mesh.

The EDS maps for the surface of active polymer nanocomposite sheet in contact with edges of the metal mesh under sustained pressure show indications of pronounced copper deposition in areas directly contacting the metal mesh under pressure (FIG. 36). This probably results from transfer of copper from the less stressed areas just outside the area covered by the metal mesh.

Figure 37:
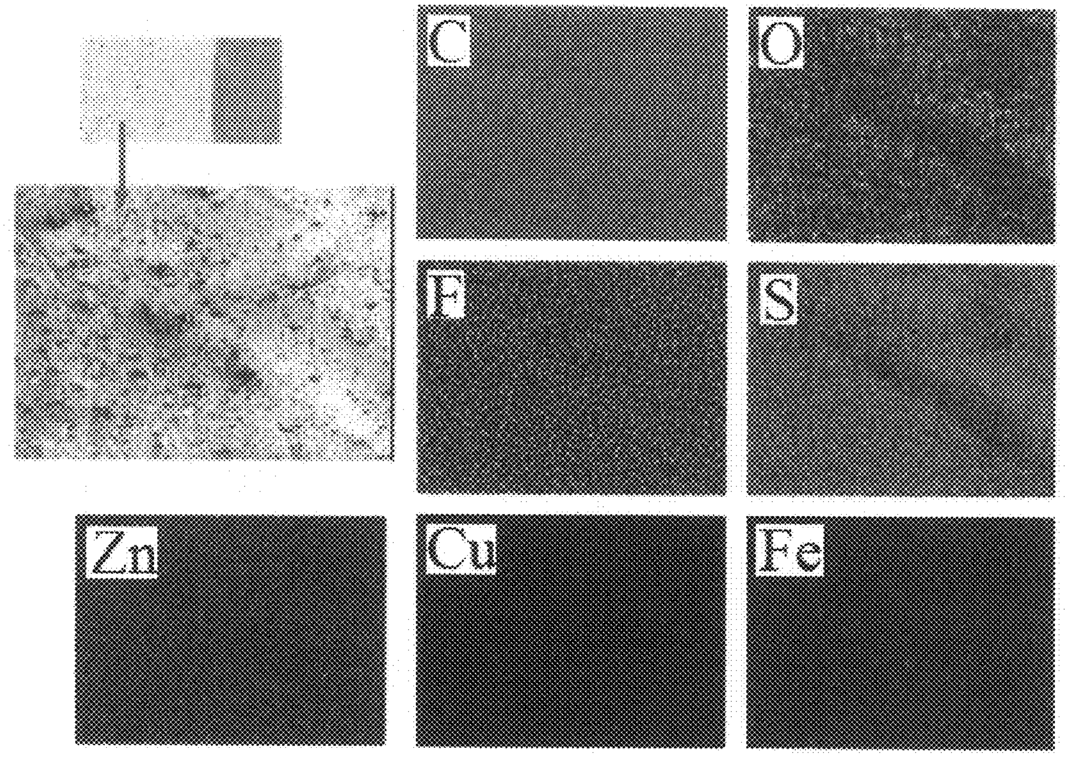
FIG. 37 shows EDS maps of the solid electrolyte polymer nanocomposite surface opposite to the surface in contact with metal mesh under pressure.
Figure 38:
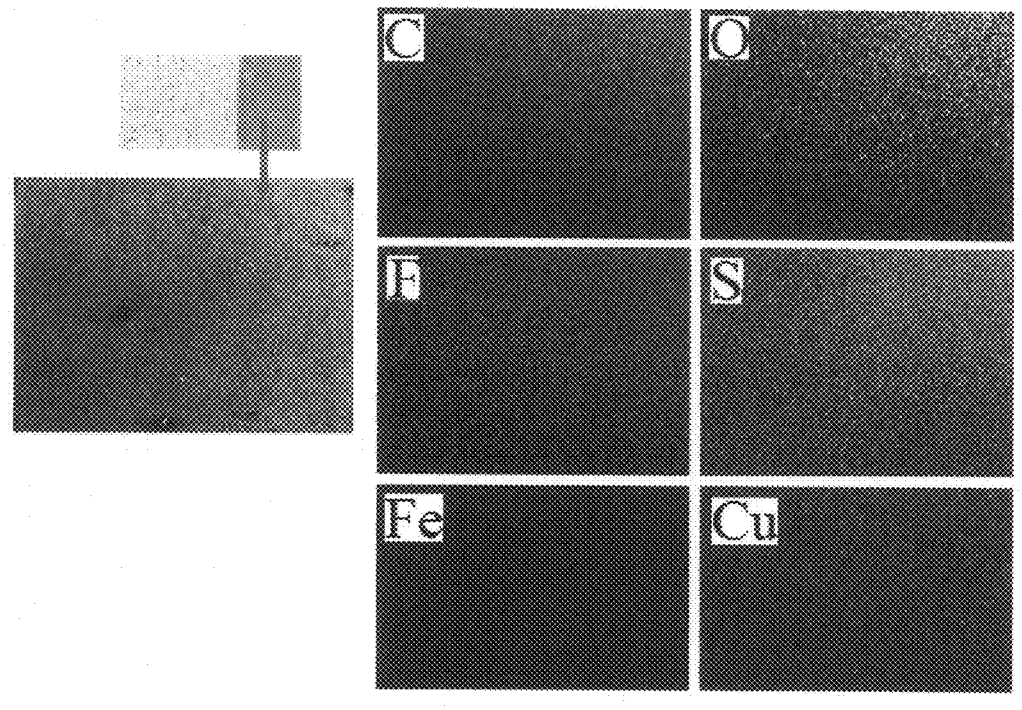
FIG. 38 shows EDS maps of the active polymer nanocomposite surface opposite to the surface in contact with metal mesh but outside the coverage area of metal mesh.

One can expect a movement of copper away from the opposite surface of the active polymer nanocomposite sheet (with non-conductive contact) toward the stressed areas of the top surface that is in contact with the metal sheet under sustained pressure. EDS maps of the opposite surface (FIG. 37) confirm the presence of Fe and Zn (migrated away from the top surface after self-healing), with only small amounts of Cu detected. It should be noted that the areas of opposite surface outside the mesh coverage area did not provide indications of Fe and Zn presence (FIG. 38), but suggested the presence of the copper (i.e., the dissolved copper salt in the solid polymer electrolyte nanocomposite).

Example 9

This examples concerns application of the self-healing phenomena toward crack repair. Epoxy-coated steel mesh was incorporated into a laminated composite comprising layers of carbon fiber mat with solid electrolyte polymer nanocomposite matrix. It is anticipated that cracking will locally damage the epoxy coating on steel mesh, and will expose the steel mesh to the solid electrolyte polymer nanocomposite. The exposed surface of steel mesh acts as the site upon which deposits form under stress to render self-healing effects at the crack site.

Figure 39:
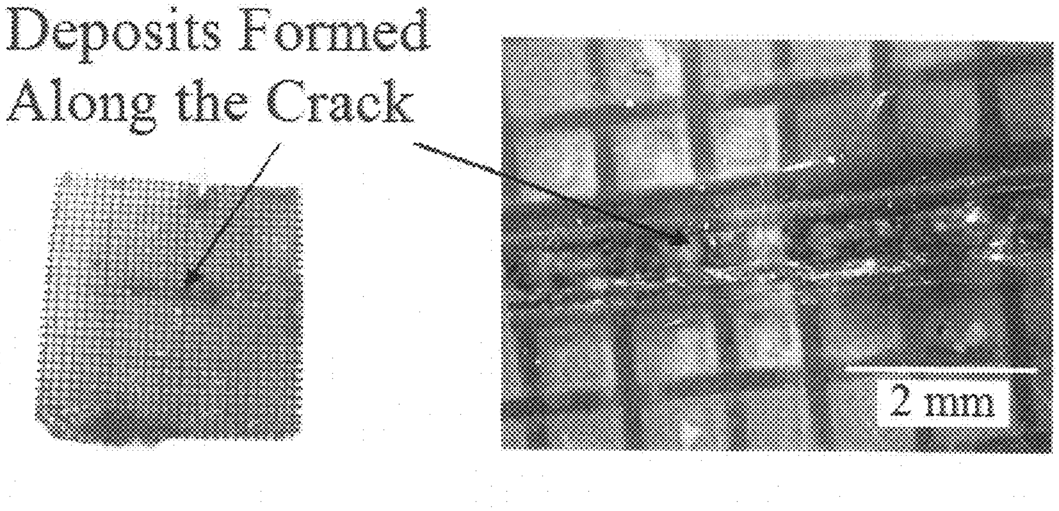
FIG. 39 shows copper deposition within the cut (crack) exposing steel in a composite of solid electrolyte polymer nanocomposite matrix and epoxy-coated steel mesh.

The solid electrolyte polymer nanocomposite solution was prepared as explained in Example 1. The epoxy-coated steel mesh was rinsed with ethanol for five minutes, and allowed to air-dry under a fume hood. A 2 cm square specimen of the epoxy-coated steel mesh was dip-coated in the solid electrolyte polymer nanocomposite solution for 15 times with 15-minuet drying intervals between subsequent dippings. After final drying over a one-day period, a cut (representing a crack) was made on the surface of the solid electrolyte polymer nanocomposite layer (at mid-height) in such a way that the steel mesh was exposed along the cut. The steel mesh was subjected to a sustained tensile load of 10-N over a one-day period. After removing the load, copper deposition could be observed along the cut (FIG. 39). In addition to the color change along the cut, copper deposition was also observed near the edges of this sample where steel was exposed.

The invention claimed is:

1. A self-healing composite comprising: (i) a polymer matrix having poly(vinylidine fluoride-co-hexafluoropropylene) (PVDF-HFP) with dissolved copper salt, dispersed zinc oxide nanoparticles and dispersed copper nanoparticles, and (ii) an embedded steel mesh; said composite develops electric potential gradient under at least one of stress and temperature gradients with said electric potential gradient driving the migration of dissolved copper ions towards said steel mesh, where deposition of said ions as copper metal at and near the interfaces of said polymer matrix with said steel mesh renders local strengthening effects.

2. Self-healing composite in claim 1, wherein said dissolved copper salt is copper (II) trifluoromethane sulfonate.

3. Self-healing composite in claim 1, wherein said polymer matrix further incorporates at least one of dispersed aluminum nanoparticles and dispersed carbon nanotubes.

4. Self-healing composite in claim 1, wherein said nanoparticles in said polymer matrix have at least one dimension less than 100 nanometer.

5. Self-healing composite in claim 1, wherein said steel mesh is coated with zinc.

6. Self-healing composite in claim 1, further comprising carbon fabric sandwiched between layers of said composite to render improved structural performance.

* * * * *